(12) United States Patent
Sano et al.

(10) Patent No.: US 7,113,645 B2
(45) Date of Patent: Sep. 26, 2006

(54) IMAGE DECOMPRESSION APPARATUS AND METHOD

(75) Inventors: Yutaka Sano, Miyagi (JP); Akio Matsubara, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 738 days.

(21) Appl. No.: 10/317,911

(22) Filed: Dec. 11, 2002

(65) Prior Publication Data

US 2003/0169935 A1 Sep. 11, 2003

(30) Foreign Application Priority Data

Dec. 11, 2001 (JP) ............................. 2001-377294

(51) Int. Cl.
G06K 9/36 (2006.01)

(52) U.S. Cl. ..................... 382/240; 382/233

(58) Field of Classification Search ............... 382/236, 382/240, 233, 252, 235, 249, 239, 248, 260, 382/251, 264, 275, 232; 386/46; 375/240.25; 708/420, 801; 702/76; 73/602
See application file for complete search history.

(56) References Cited

U.S. PATENT DOCUMENTS

| | | | |
|---|---|---|---|
| 4,792,510 A | 12/1988 | Kumano et al. | 430/65 |
| 4,903,016 A | 2/1990 | Murai et al. | 340/3.53 |
| 5,838,821 A | 11/1998 | Matsubara et al. | 382/190 |
| 5,867,602 A * | 2/1999 | Zandi et al. | 382/248 |
| 5,998,842 A | 12/1999 | Sano | 257/366 |
| 6,046,773 A * | 4/2000 | Martens et al. | 375/240.25 |
| 6,101,284 A | 8/2000 | Matsubara et al. | 382/260 |
| 6,185,340 B1 * | 2/2001 | Comer | 382/236 |
| 6,218,703 B1 | 4/2001 | Sano | 257/347 |
| 6,307,968 B1 * | 10/2001 | Liguori | 382/235 |
| 6,571,050 B1 * | 5/2003 | Park | 386/46 |
| 6,614,428 B1 * | 9/2003 | Lengyel | 345/420 |
| 6,778,709 B1 * | 8/2004 | Taubman | 382/240 |
| 6,801,665 B1 * | 10/2004 | Atsumi et al. | 382/239 |
| 6,934,420 B1 * | 8/2005 | Hsu et al. | 382/252 |
| 6,985,632 B1 * | 1/2006 | Sato et al. | 382/240 |
| 2002/0057843 A1 | 5/2002 | Matsubara | 382/240 |
| 2003/0068089 A1 | 4/2003 | Sano et al. | 382/232 |

FOREIGN PATENT DOCUMENTS

| | | |
|---|---|---|
| EP | 0 859 335 A2 | 8/1998 |
| FR | 2 805 640 | 8/2001 |
| JP | 2003-179759 | 6/2003 |

OTHER PUBLICATIONS

Panchanathan, S. and Jain, A., "Wavelet Based Scalable Image Compression," Journal of Electronic Imaging, vol. 5, Feb. 7, 1995, pp. 505-514.

Panchanathan, Sethuraman et al., "Image Scalability Using Wavelet Vector Quantization," Journal of Electronic Imaging, vol. 5, No. 2, Apr. 1996, pp. 167-174.

Prabhakar, Sunil, "Browsing and Placement of Multiresolution Images on Secondary Storage," Multimedia Computing and Systems 1997, IEEE International Conference on Ottawa, Ontario, Canada, Jun. 3-6, 1997, pp. 636-637.

Zhong, MinSheng, Zhengming, Ma, "JPEG2000-Based Scalable Reconstruction of Image Local Regions," Proceedings of 2001 International Symposium on Intelligent Multimedia, Video and Speech Processing, May 2-4, 2001, pp. 174-177.

European Patent Office Search Report mailed Jul. 1, 2003, European Application No. 02027615.0.

* cited by examiner

*Primary Examiner*—Anh Hong Do
(74) *Attorney, Agent, or Firm*—Blakely, Sokoloff, Taylor & Zafman LLP

(57) ABSTRACT

In a still image decompression process, operations of respective parts of a still image decompression apparatus are controlled so as to limit the operations into those such that a decompressed image on a specific LL subband is obtained.

26 Claims, 27 Drawing Sheets

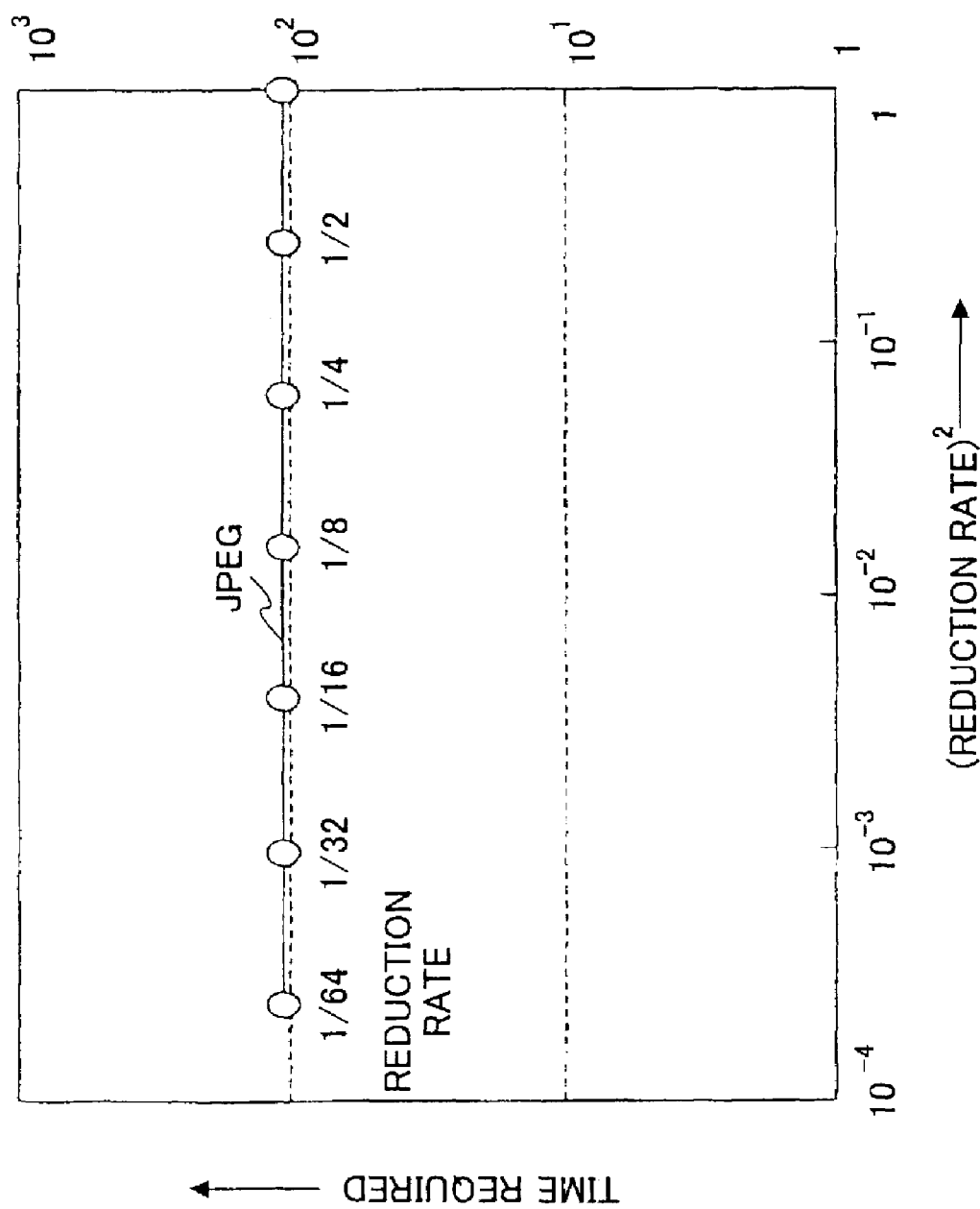

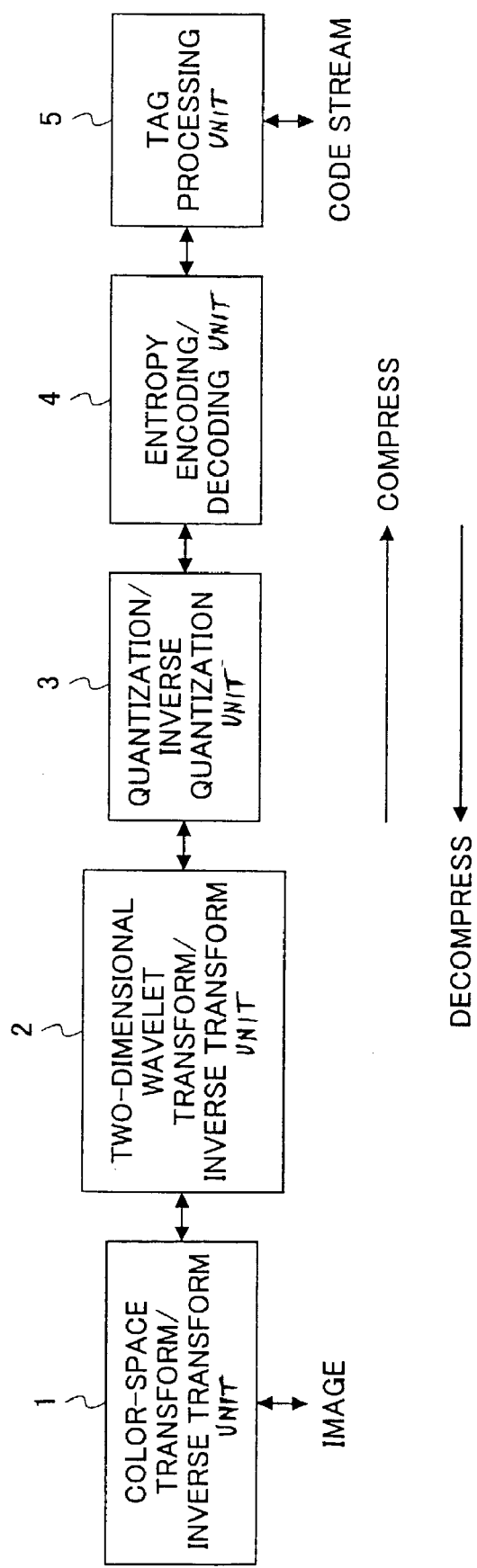

0LL (ORIGINAL IMAGE TILE)

DECOMPOSITION_LEVEL_0

DEEPER/HIGHER

DECOMPOSITION_LEVEL_1

DECOMPOSITION_LEVEL_2

DECOMPOSITION_LEVEL_3

IMAGE DECOMPRESSION APPARATUS AND METHOD

The present application claims priority to the corresponding Japanese application No. 2001-377294 filed on Dec. 11, 2001, the entire contents of which are hereby incorporated by reference.

BACKGROUND OF THE INVENTION

1. Field of the Invention

The present invention relates to an image decompression apparatus which decompresses image data for a still image or an animation made of a plurality of still images, and an image decompression method performed in this apparatus.

2. Description of the Related Art

In recent years, spread of highly definite images is remarkable. This is at least partially because of improvement in definition/resolution of image data processing devices such as input devices such as a digital still camera, a scanner, and so forth, and output devices such as an ink-jet printer, a display device and so forth. And now, a method according to JPEG (joint Photographic Experts Group) is most widely used as an image compression/decompression algorithm handling such highly definite still images. In this method, in order to eliminate the degree of redundancy in a space domain, a two-dimensional dispersion cosign transform technique is used.

A basic function of this method according to JPEG is only to compress and decompress still images. No specific discussion has been made as to manipulating image data in a compressed state, decompressing only a specified area of the image, and so forth. Moreover, according to JPEG, an image is treated as having a "flat structure" without layers. Therefore, in order to perform image processing on an image, the relevant code data should be first completely decoded.

In image compression/decompression processes, generally speaking, a time required for decompressing code data so as to reproduce an image increases as the number of pixels of the image increases. This problem becomes significant to the point it cannot be ignored as the definition/resolution of an original image to be processed increases as mentioned above. FIG. 1 shows a relationship between image size reduction rate and a time required for decompressing a compressed original image.

The image size reduction rate means a ratio of a size of a display area and a size of the original image with respect to the number of pixels of vertical/horizontal side of each rectangle. In this example, a 74M-pixel color image (RGB each: 24 bit) is used as the original image. It is noted that the time required depends on a performance of device (MPU/DSP/ASIC, or the like) which performs the JPEG decompression operation. However, as can be clearly seen from the figure, a fixed time is required for JPEG decompression without regard to the reduction rate. This is because, according to the standard scheme of the JPEG, as mentioned above, code data should be first decompressed completely without regard to the reduction rate. Generally speaking, it is difficult to use all the pixels of an original image having high definition/resolution, in other words, having a large size, because the number of pixels which can be used for a display is limited by the performance of the display device itself.

Accordingly, in many cases, a display is made after reducing the size of the original image, in other words, reducing in the number of pixels thereof. However, according to the standard JPEG algorithm, it is necessary to first decompress the original image completely even in a case where merely a reduced image needs to be displayed. Then, after the complete decompression, the number of pixels is reduced by means of a thinning-out process or the like. The time required for obtaining all the pixel values by decompressing code data increases in proportion to the number of pixels processed. This time depends on the performance of the MPU used, memory capacity and so forth. However, in the above-mentioned example, several minutes or tens of minutes are required. This means that handling of a large-size/high-definition/resolution image may be troublesome.

SUMMARY OF THE INVENTION

An image decompression apparatus and method are described. In one embodiment, the image decompression apparatus comprises an input unit to input a code sequence of wavelet coefficients, a decoding unit to decode the input code sequence, an inverse-quantization unit to perform inverse-quantization on the decoded wavelet coefficients, an inverse-wavelet-transform unit to perform inverse wavelet transform on the inverse-quantized wavelet coefficients so as to obtain pixel values, and a control unit to control operations of the input unit, the decoding unit, the inverse-quantization unit, and the inverse-quantization unit to limit operations into those such that a decompressed image of a specific LL subband be obtained therefrom.

BRIEF DESCRIPTION OF THE DRAWINGS

Other features of the present invention will become more apparent from the following detailed description when read in conjunction with the accompanying drawings.

FIG. 1 illustrates a change in time required for decompressing a JPEG-compressed sample image data with respect to a size-reduction rate on an image display;

FIG. 2 illustrates the level-wise wavelet transform technology according to JPEG2000;

DETAILED DESCRIPTION OF PREFERRED EMBODIMENT

The present invention has been devised in consideration of the above-described situation, and is directed to an image decompression system by which a large-size/high-definition/resolution image in a form of code data (including an animation formed of a plurality of consecutive still images) can be displayed on a specified display region on a display device at high speed. In other words, according to the present invention, the time required for decompressing a compressed image can be effectively reduced especially in case of a display is made with a reduced size.

According to the present invention, decompression operations are limited to be performed within a scope of a given code sequence of wavelet coefficients such that the minimum code data be handled necessary for obtain a decompressed image on a specific LL subband with respect to the level-wise wavelet transform technology (see FIGS. 3A through 3D). For this purpose, it is preferable to beforehand select a necessary part of a given code sequence of wavelet coefficients by use of interpretation of tag information included in a header of the given code sequence. By selecting and extracting beforehand only the necessary part of code sequence which should be processed in an actual decompression process, it becomes possible to effectively reduce the amount of image data processing required for finally obtaining the decompressed image on the specific LL subband, in comparison to a conventional JPEG scheme according to which all the given code sequence is first decompressed even in a case only a decompressed image on a specific LL subband is needed.

Figure 3A:
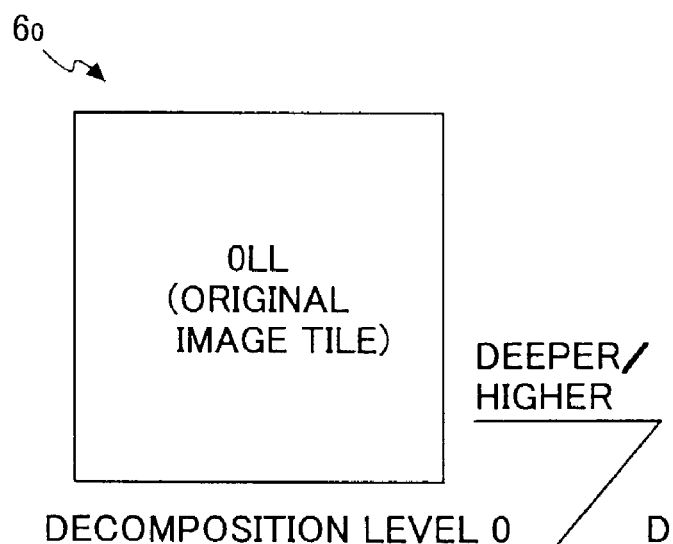
FIGS. 3A through 3D illustrate the level-wise wavelet transform scheme.
Figure 3B:
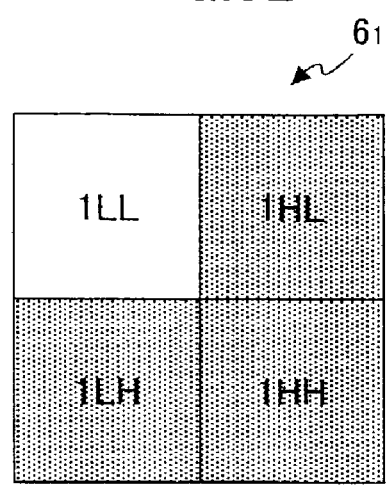
Figure 3C:
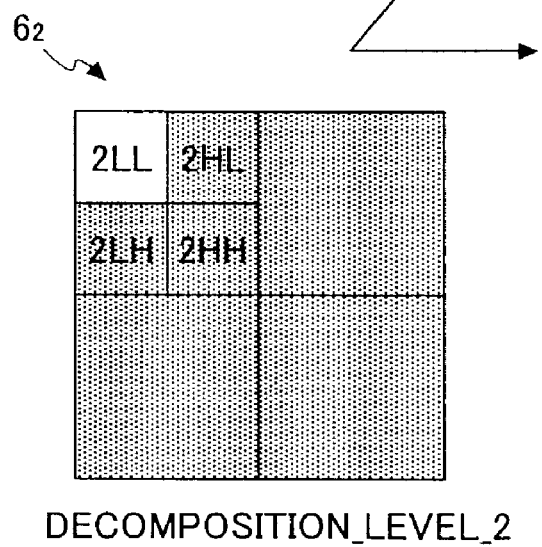
Figure 3D:
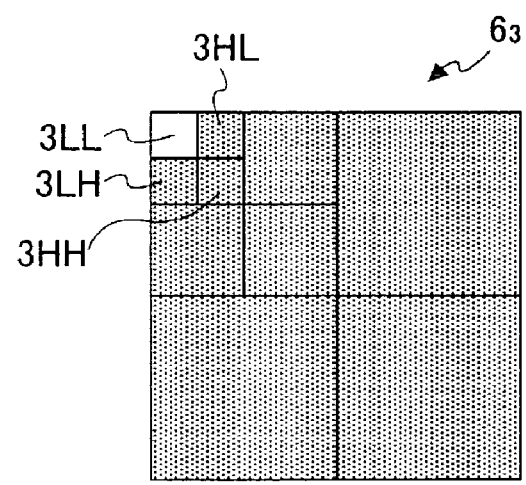

For example, with reference to FIGS. 3A through 3D, in order to obtain a size-reduced image on a 2LL subband on a decomposition level 2 shown in FIG. 3C, only wavelet coefficients of 3LL, 3HH, 3LH and 3HL subbands on a decomposition level 3 shown in FIG. 3D are needed. Accordingly, in this case, by limiting the code data to be processed to that of these 3LL, 3HH, 3LH and 3HL subbands beforehand, it becomes possible to effectively reduce the time required for the necessary decompression operation. On the other hand, according to a standard JPEG2000way, in order to obtain the size-reduced image of the 2LL subband same as in the above-mentioned case, it is necessary to perform the decompression operation throughout all the code data on the decomposition level 3 shown in FIG. 3D into the 0LL data shown in FIG. 3A, first, for example, and then reducing the obtained 0LL image into the desired image size (corresponding to 2LL).

The present application is based on Japanese priority application No. 2001-377294 filed on Dec. 11, 2002, the entire contents of which are hereby incorporated by reference.

The inventors of the present invention filed a U.S. patent application Ser. No. 10/247,497 on Sep. 20, 2002 which discloses Image Processing System Processing Code Data relating to the present invention, the entire contents of which are hereby incorporated by reference.

First, a "level-wise coding algorithm" and a "JPEG2000 algorithm" which is applied as a base of one embodiment of the present invention will now be described briefly. FIG. 2 illustrates one embodiment of the level-wise coding algorithm which forms a base of JPEG2000 algorithm. In order to perform processing according to this level-wise coding algorithm, a 2-dimensional wavelet transform/inverse transform unit 2, a quantization/inverse quantization unit 3, an entropy coding/decoding unit 4, and a tag processing unit 5 are used, for example. As compared with the conventional JPEG algorithm, one of the biggest differences is in the transform method. In the conventional JPEG scheme, a discrete cosign transform (DCT) is applied, while a discrete wavelet transform (DWT) is applied in the level-wise coding compression/decompression algorithm of JPEG2000.

DWT is advantageous in that the image quality is improved at large compressed zone in comparison to DCT. This is one reason that JPEG2000 is applied as a successor of the conventional JPEG. Moreover, as another difference, according to the JPEG2000, a functional block called "tag processing unit 5" is added, in order to perform code formation. By utilization of the function of this unit, at a time of compression operation, compressed data is produced in a form of a code stream, and interpretation of the code stream is required in decompression process. Thanks to the scheme providing code steams, JPEG2000 can provide the following various advantageous functions:

For example, FIGS. 3A through 3D illustrate subbands in each decomposition level, in this case the number of decomposition is 3. On the basis of the block configuration shown in FIGS. 3A through 3D, the compression/decompression process can be terminated at an arbitrary level according to a level of octave separation of the DWT. JPEG2000 prescribes a definition of this concept "decomposition", as follows: 'Decomposition Level: A collection of wavelet subbands where each coefficient has the same spatial impact or span with respect to the source component samples. These include the HL, LH, and HH subbands of the same two-dimensional subband decomposition. For the last decomposition level, LL subband is also included'.

In addition, in many cases, in FIG. 2, a color space transform/inverse transform unit 1 is connected at an input-and-output portion for an original image. This unit performs a color-space transform, for example, a transform from a YMC color expression system of yellow/magenta/cyan or an RGB color expression system of red/green/blue into a YUV or YCbCr color expression system, as well-known.

Figure 4:
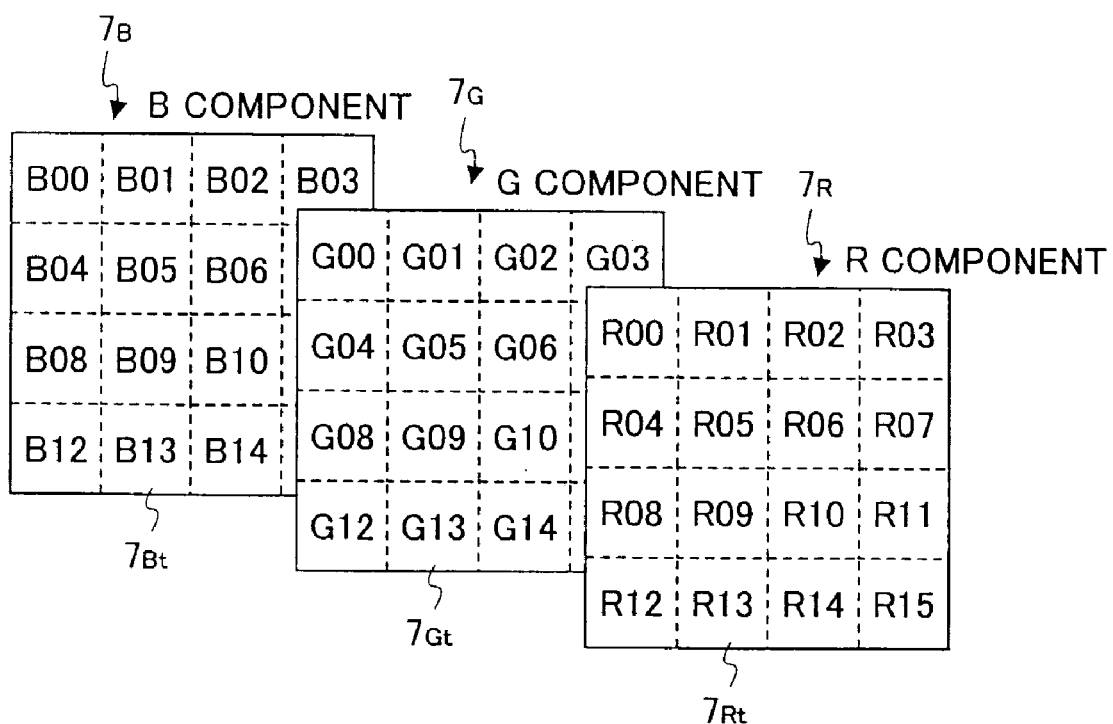
FIG. 4 illustrates respective tile-divided components of color image data applicable to one embodiment of the present invention.

The JPEG2000 algorithm will now be described in detail. FIG. 4 illustrates each color component of a color image, which is divided into respective tiles. Thus, each color component 7R, 7G and 7B (in a case where the RGB color system is assumed) of the color image is divided into by areas (called tiles) 7Rt, 7Gt and 7Bt. Each tile, R00, R01, . . . , R15/G00, G01, . . . , G15/B00, B01, . . . , B15 is used as a basic unit on which the data compression/decompression process is performed. Thus, compression/decompression operation is performed independently for every component and every tile.

At a time of coding, the data of each tile of each component is input to the color space transform unit 1 of FIG. 2, where predetermined color space transform is performed. After that, the data undergoes a 2-dimensional wavelet transform (sequence conversion) in the 2-dimensional wavelet transform unit 2, and thus, the data is divided into frequency bands. That is, a tile of the original image (0LL; 60) on the decomposition level 0 obtained from the above-mentioned tile-division process shown in FIG. 3A undergoes a 2-dimensional wavelet transform, and, thus, is divided into subbands 1LL, 1HL, 1LH and 1HH (61) on the decomposition level 1 shown in FIG. 3B.

After that, on the low frequency subband 1LL on the level 1, a 2-dimensinal wavelet transform is performed again, and, thus, is further divided into subbands 2LL, 2HL, 2LH and 2HH (62) as shown in FIG. 3C. Similarly, after that, on the low frequency subband 2LL on the level 2 shown in FIG. 3C, a 2-dimensinal wavelet transform is performed, and, thus, is further divided into subbands 3LL, 3HL, 3LH and 3HH (63) as shown in FIG. 3D.

Figure 5:
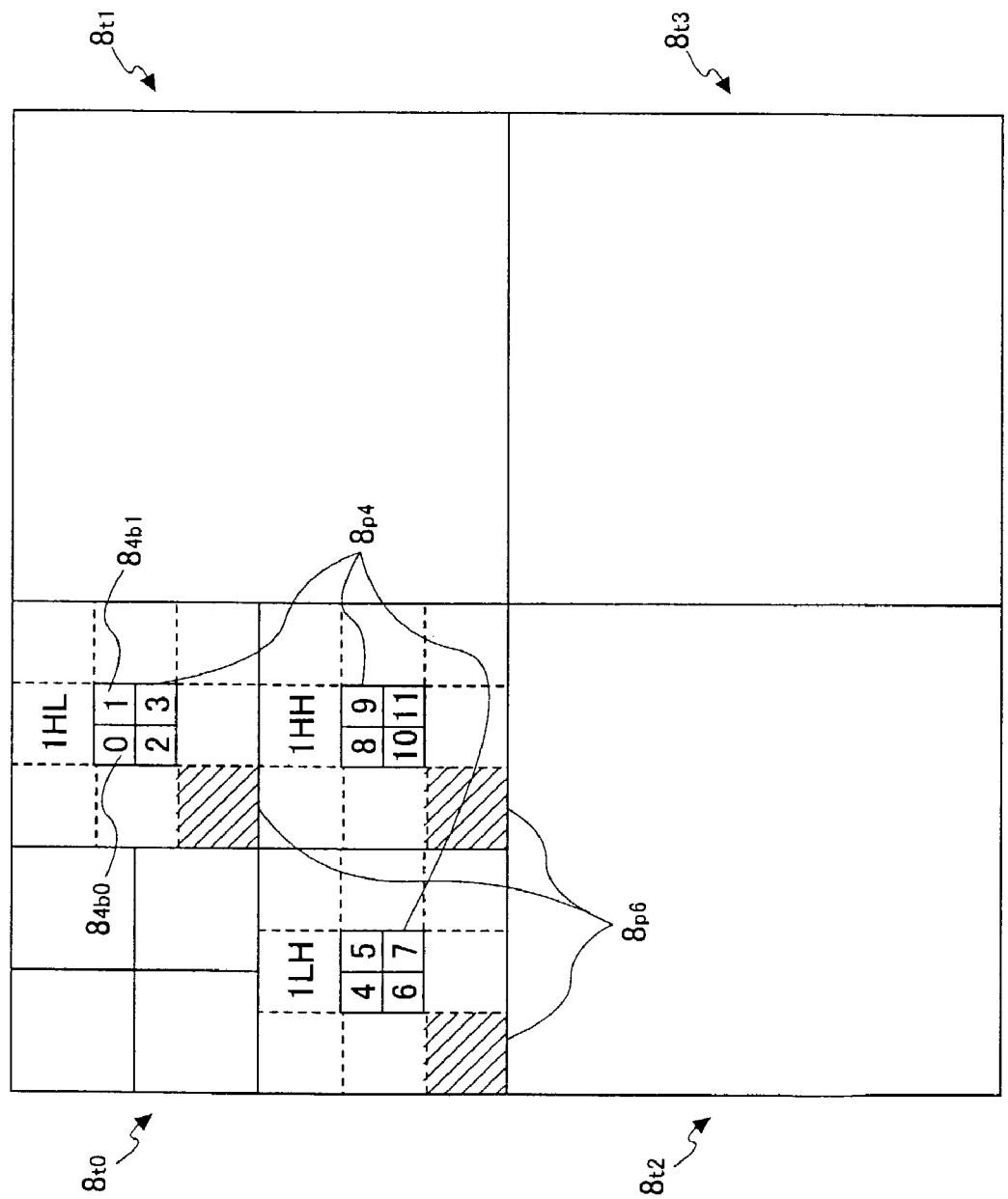
FIG. 5 illustrates the concepts of tiles and precincts applied to one embodiment of the present invention.

Subsequently, pixel value bits to be coded are determined according to a predetermined order, and, a context is created for each target bit from periphery bits in the quantization unit 3 shown in FIG. 2. FIG. 5 illustrates a relation between the concepts of precincts and code blocks. Wavelet coefficients having undergone the quantization processing are divided into rectangular areas called "precincts" for each subband. This scheme is introduced in order to efficiently use a memory area during implementation.

As shown in FIG. 5, each precinct, for example, a precinct 8p4 includes three rectangular areas for the same spatial area. In the example shown in FIG. 5, the original image 8 is divided into four tiles, i.e., 8t0, 8t1, 8t2, and 8t3, on the decomposition level 1. Furthermore, each precinct is divided into "code blocks" (i.e., for example, the precinct 8p4 is divided into the code blocks 84b0, 84b1, . . . ). Each code block is used as a basic unit when entropy coding is performed.

In order to improve the coding efficiency, each coefficient value may be decomposed into bit planes, the order may be determined for the bit planes with respect to the respective pixels or code blocks, and, thus, layers of bit planes may be formed. Namely, from the bit planes of coefficient values, layers based on their significance thereof may be created, and coding may be performed for each layer. Then, only a number of layers including the most significant layer (MSB) and several layers subsequent thereto may be coded, and, the remaining layers including the least significant layer may be truncated.

In the entropy coding unit 4, coding is performed on the tiles of each component based on a probability estimation technique from the contexts and target bits. Thus, the coding processing is performed for tile units throughout the components with respect to the relevant color space of the original image.

Figure 6:
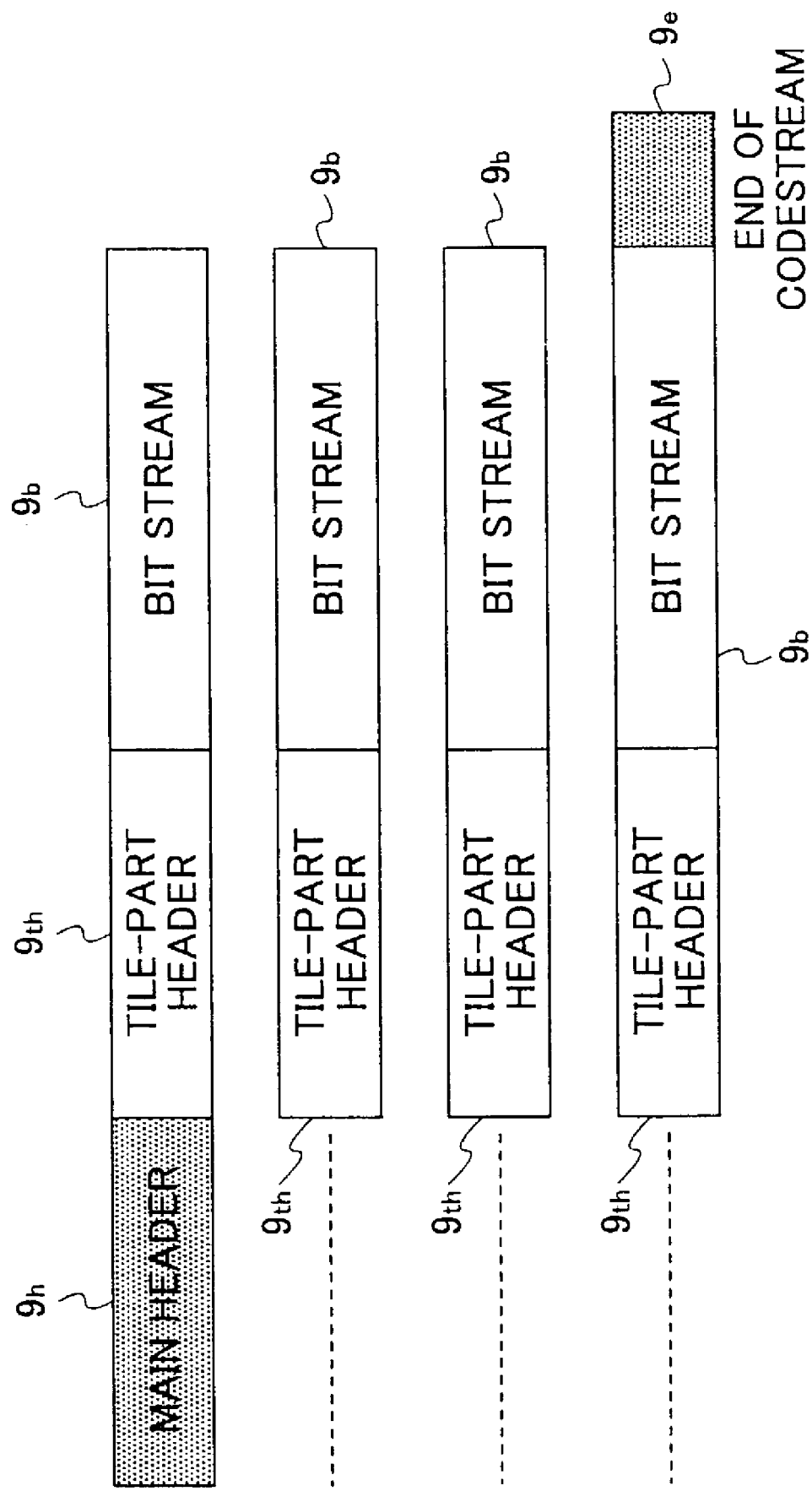
FIG. 6 illustrates a configuration of a code stream applicable to one embodiment of the present invention.

Finally, the tag processing unit 5 performs the process of attaching a tag to a code stream after binding all the coded data into a single code stream. The structure of the code stream is briefly shown in FIG. 6. Tag information called headers (including a main header 9h and tile part headers 9th) is attached to the head of the code stream, and the head of each tile part, and the coded data (a bit stream 9b) for each tile is attached subsequently. A tag (EOC tag 9e) is attached to the last of the code stream.

On the other hand, at the time of decoding, image data is produced from a code stream for each tile of each component, according to the process inverse to that performed at the time of coding described above. In this instance, with reference to FIG. 2, the tag processing unit 5 interprets the tag information attached to the code stream input from the exterior, the code stream is decomposed into code streams on respective tiles of each component, and decode processing is performed for every code stream on each tile of each component. While positions of pixel value bits to be decoded are determined according to the sequence based on the tag information, the context is produced from the arrangement of peripheral bits (already decoded) in the inverse quantization unit 3. In the entropy decoding unit 4, according to the probability estimation technique, from the code stream and the contexts, the target bits are reproduced, and are put at the relevant pixel position.

Thus, since the decoded data has a form of being divided into the respective frequency bands (subbands), each tile of each component of the image data is restored by performing a 2-dimensional wavelet inverse transform in the 2-dimensional wavelet inverse transform unit 2. The obtained restored data is transformed into data of the original color expression system by the color space inverse transform unit 1.

Figure 7:
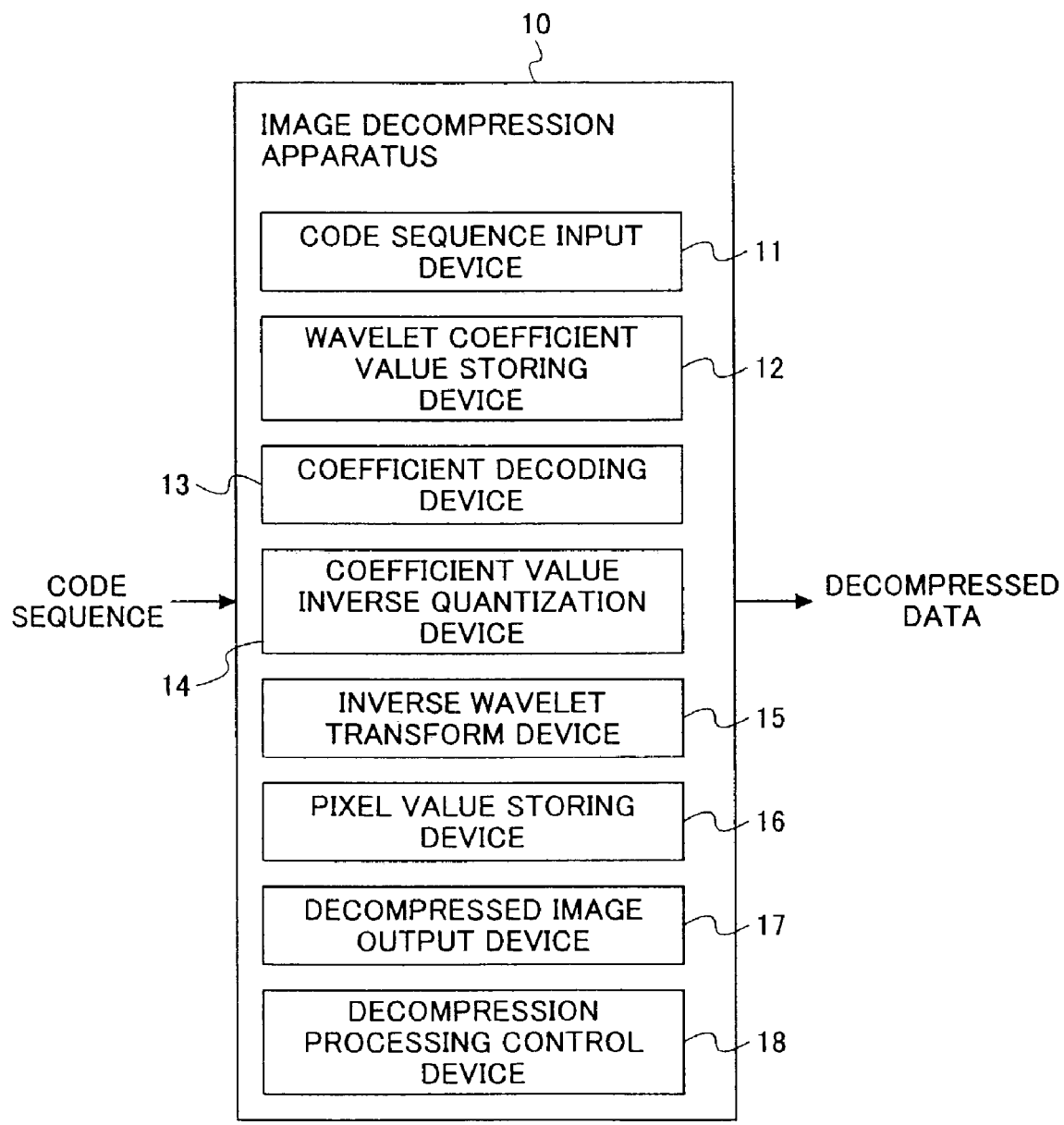
FIG. 7 illustrates one example of an image decompression apparatus according to one embodiment of the present invention.

Embodiments of the present invention will now be described in detail. FIG. 7 illustrates a configuration of a still image decompression apparatus according to an embodiment of the present invention. In the still image decompression apparatus 10 (simply referred to as an image decompression apparatus, hereinafter), wavelet coefficients in a low-frequency LL subband of the level-wise wavelet transform technology are used for image decompression. Thereby, in this apparatus, it may be possible to display a large-scale, high definition still image, or a video with a reduced size at high speed. Namely, large-scale, high-definition still images or animation formed of successive frames of still images may be displayed on a predetermined region of a display device at a high speed, as will be described in detail.

The image decompression apparatus 10 includes a code sequence input device 11, a wavelet coefficient value storing device 12, a coefficient decoding device 13, a coefficient value inverse quantization device 14, an inverse wavelet transform device 15, a pixel value storing device 16, a decompression image output device 17, and a decompression processing control device 18. The code sequence input device 11 inputs a code sequence as coded data. The wavelet coefficient value storing device 12 stores the code sequence of wavelet coefficient values input through the code sequence input device 11.

The coefficient decoding device 13 decodes the wavelet coefficients stored in the wavelet coefficient value storing device 12. The coefficient value inverse quantization device 14 inverse-quantizes the wavelet coefficient values having been decoded by the coefficient decoding device 13. The inverse wavelet transform device 15 transforms the coefficient value inverse-quantized by the coefficient value inverse quantization device 14 into pixel values.

The pixel value storing device 16 stores the pixel values having been transformed and decompressed by the inverse wavelet transform device 15. The decompression image output device 17 outputs a decompressed image thus stored in the pixel value storing device 16 to a display device, not shown. The decompression processing control device 18 controls the above-mentioned respective devices 11 through 17 so as to cause them to perform decompression operation especially for a specific LL subband. This decompression apparatus 10 can handle code streams obtained through coding according to a method specified by JPEG2000 (ISO/IEC FCD 15444-1).

According to the apparatus 10 of the present invention, it becomes possible by using only LL subband coefficient values on a level higher from among the wavelet transform coefficients given, to reduce sharply the time required for a decompression operation in comparison to where the decompression operation is performed simply for all the decomposition levels. That is, the time required for decompression can be reduced more effectively as the rate in size between an original image and an image display region to which the original image is reduced in size with respect to the number of pixels to be displayed, in comparison to applying the above-mentioned conventional JPEG scheme in which all the wavelet coefficients are simply decompressed first.

Accordingly, according to one embodiment of the present invention, reduction in the image data processing amount is more remarkably advantageous in fields such as those handling satellite photographs/aerial photographs/medical images/scientific research photographs/cultural property photographs, each of which handles a huge amount of image data, i.e., large-scale and high-definition still images.

Moreover, according to one embodiment of the present invention, in the case of the display of motion still images, a smooth motion without frame omission is reproducible. Moreover, a search of contents can also be performed efficiently merely by viewing thumbnail images within a short review time at high speed. Moreover, by keeping code sequences to be decompressed in a JPEG2000 format, no trouble arises concerning file compatibility, and, also, review and/or enjoying of high-definition still images, or enjoying of smooth motion animation can be achieved without feeling stress.

It is preferable to configure the decompression processing control device 18 so that a storage device is provided to store image values on LL subbands obtained intermediately during a decompression process performed for a specific LL subband. For example, when obtaining a specified 2LL subband, 4LL and 3LL, if any, for example, should automatically occur in the case where the deepest decomposition level is 4 or more. By utilizing the stored image values of the intermediate LL subbands, it becomes possible to obtain reduced-size images therefrom directly without performing an extra decompression operation at this time. Since pixel values of the LL subbands on levels higher in number than a specific level occurring during the decompression process for the specific level are thus stored, by utilizing these values, it becomes possible to display a plurality of images with different sizes simultaneously.

Figure 8:
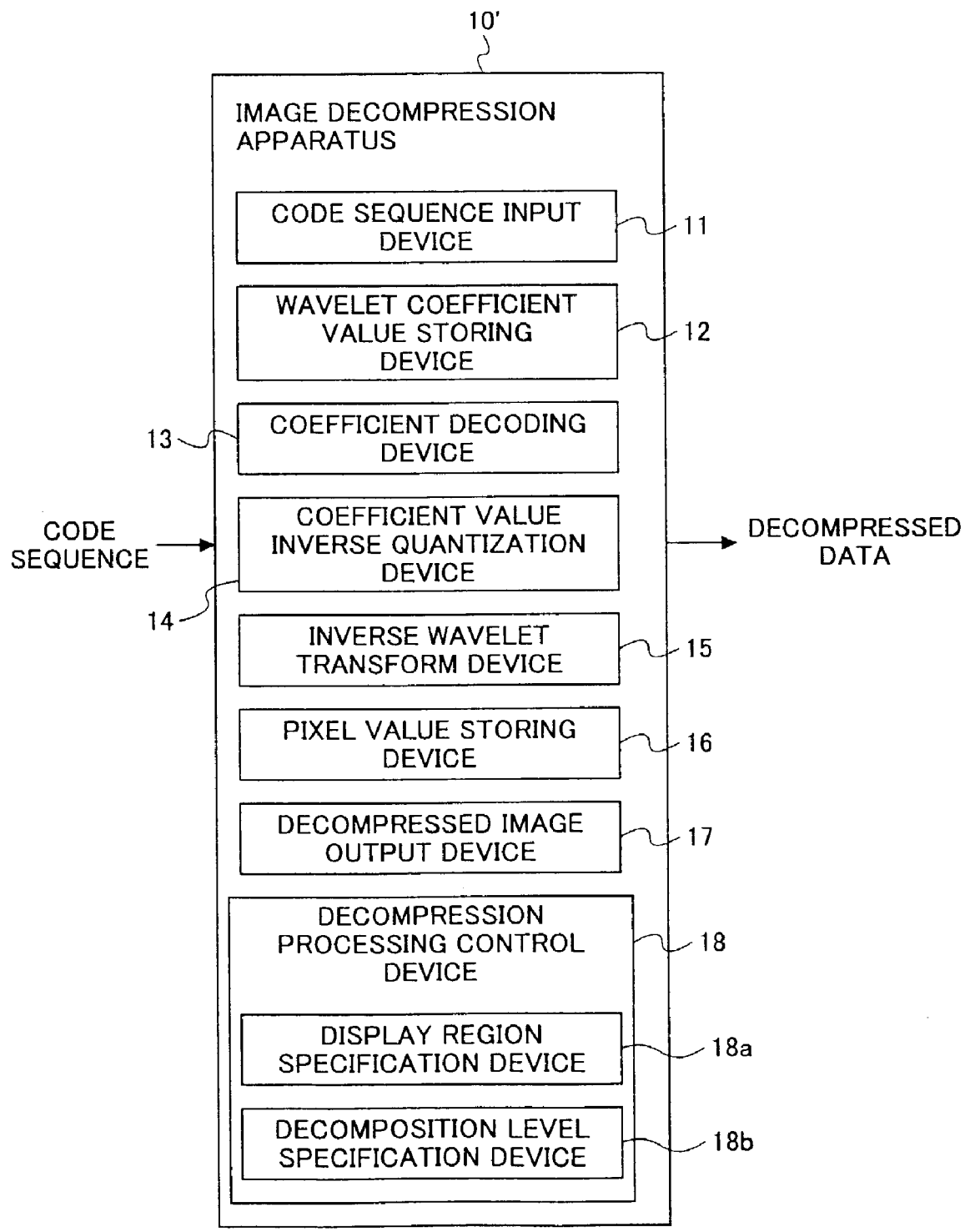
FIG. 8 illustrates another example of an image decompression apparatus according to one embodiment of the present invention.

FIG. 8 illustrates a configuration of a second embodiment of a still image decompression apparatus according to the present invention. In this embodiment, the decompression processing control device 18 as described with reference to FIG. 7 specifically includes a display region specification device 18a and a decomposition determination device 18b. The display region specification device 18a is used for specifying a display region in which a reduced image is to be displayed, on the display device in terms of pixel units for the vertical direction and the horizontal direction on the display region.

The display region specification devise 18a calculates a decomposition level such that an image obtained from wavelet coefficient values of the LL subband on the calculated decomposition level can be displayed in the specific display region. On the other hand, the decomposition determination device 18b may be used for directly specifying the decomposition level, the wavelet coefficient values of the LL subband on the specified decomposition level being then used for display in the display region. For example, when the decomposition level 2 is specified, the wavelet coefficient values on the 2LL subband are used for an image display in the display region (see FIG. 3C).

By utilizing the display region specification device 18a of the decompression processing control device 18, it performs calculations to determine a decomposition level to which the decompression operation should be performed for the purpose of obtaining image values required for displaying an image in a specified display region, only by specifying the display region. Accordingly, the operator becomes free from the different operation of determining a specific decomposition level to which decompression operation is to be performed.

In a third embodiment of the present invention, a size change device is provided in the decompression processing control device 18 for performing size change processing on pixel values of a decompressed image, together with a device for specifying whether or not such a size change operation is to be performed. Such a size change operation is performed for fine adjustment of the image size to be displayed on the above-mentioned predetermined display region so as to provide an image size which coincides with the size of the predetermined display region.

Specifically, for the purpose of such fine adjustment in image size, interpolation processing for slightly increasing the number of pixels, or thinning out processing for slightly reducing the number of pixels of the image, each well-known, may be employed. In case the user specifies that no size change processing is to be performed, an actual size reduction rate to be applied may be determined as the power of ½ obtained automatically from a LL subband of a decomposition level, as mentioned above.

In case the user specifies an arbitrary size reduction rate, this specified value can be determined as the actual size reduction rate. In this case, an actual size reduction operation is performed in combination of the selection of a decomposition level to provide an LL subband thereof, i.e., a power of ½, and after that, the above-mentioned thinning out operation or interpolation operation may be made to perform the fine adjustment in the image size.

Specifically, in the case where an actual size reduction rate is a power of ½, one of the following three types of display methods can be selected. The first display method is such that an image obtained from a specific LL subband can be nearest to the display region specified on the display device. The second display method is such that an image obtained from a specific LL subband can be immediately larger than the display region specified on the display device. The third display method is such that an image obtained from a specific LL subband can be immediately smaller than the display region specified on the display device.

By this method, it is possible to generate display of a size-reduced image having a size obtained from applying a size reduction rate corresponding to a power of ½ which is near to the display region specified on the display device, by use of the decompression processing control device 18. Furthermore, by further performing an above-described size change operation, it becomes possible to generate a display having a size precisely coincident with the size of the display region of the display device.

In a fourth embodiment of the present invention, a device is provided in the decompression processing control device 18 for specifying a spatial area to be decompressed, a color-space component to be decompressed, or an operation sequence/order in decompression operation. As to the specification of a spatial area to be decompressed, a spatial area to be decompressed may be specified with respect to tile units or precinct units. As to the specification of a color-space component to be decompressed, in the case where image data is expressed in a color space to include components of R (red), G (green), B (blue); Y (luminosity), U (blue color difference), V (red color difference); or Y (luminosity), Cb (blue color difference), Cr (red color difference), any one of these components may be specified as a target component to be specifically decompressed.

Thus, by specifying a specific spatial area or a specific color-space component to be decompressed, it becomes possible to effectively reduce the amount of data processing performed by the image decompression apparatus 10 (10') to the minimum necessary amount. Accordingly, it becomes possible to further improve the processing speed to further reduce the time required for obtaining a display of a desired image.

As to the specification of a decompressing operation sequence/order, an order may be specified such that the decompression operation is started from the maximum decomposition level or the minimum layer (with the most significance). Alternatively, it is also possible to determine beforehand a priority for specific spatial areas (for example, a central area), or the like. In such a case, the decompression operation may be started on a specific spatial area having a higher priority given beforehand. In so doing, it becomes possible to freely control the order/sequence of display processes on a relevant image. As a result, it becomes possible to cause a specific spatial area of a relevant image to be displayed first as well as effectively reduce the time required for obtaining the display thereof on the display device. Therefore, efficiency and accuracy in search of image contents can be further improved, for example.

In a fifth embodiment of the present invention, the decompression processing control device 18 includes a device by which a control is made on the input I/O or the wavelet coefficient value storing device such that wavelet coefficient values on decomposition levels shallower than or lower than a predetermined level are prevented from being input to the devices and, thus, prevented from undergoing the decoding operation and other subsequent operations in the image decompression apparatus 10 (10').

This may be achieved by controlling the code sequence input device 11 such that data input can be performed only on data required for providing a decompressed image on a specific LL subband, or by controlling the coefficient value storing device 12 such that it stores data only required for providing a decompressed image on the specific LL subband. Therefore, it becomes possible to effectively reduce the amount of data input to the decompression apparatus 10 (10') or to effectively reduce the amount of data to be processed. Accordingly, it becomes possible to achieve efficient usage of data processing resources including the memory resources in the decompression apparatus. Furthermore, it becomes possible to effectively improve the throughput of the decoding device/inverse quantization device/inverse wavelet transform device as they should perform merely the minimum necessary amount of data processing. Furthermore, it is also possible to effectively reduce the power consumption thereof accordingly. Such advantages are especially effective when the decompression apparatus 10 (10') is embodied in a portable device.

In a sixth embodiment of the present invention, the decompression processing control device 18 includes a device for performing parallel decompression operations, and also storage for already decompressed frames and/or not-yet decompressed frames, for the purpose of further improving quick display performance and also provision of higher-grade functions. By achieving parallel decompression operations, it becomes possible to improve quick display performance in view of the hardware. That is, the further improvement in the speed in quick display performance is realizable by achieving parallel decompression operations for every tile, every color-space component, and every time-axis-sequential frame.

The above-mentioned storage of already decompressed frames and/or not-yet decompressed frames will now be described in detail. For this purpose, provided are a device for specifying the number of not-yet-decompressed frames to be stored, and a device storing the code data of the specified number of not-yet-decompressed frames, or for specifying the number of already-decompressed frames to be stored, and a device storing the code data of the specified number of already-decompressed frames.

Therefore, it becomes possible to further add a useful function to the quick display function. That is, the reproduction of an animation may be terminated, and, then, a relevant still image may be displayed (as a stop motion image display function). Furthermore, it is also possible to reduce the size reduction rate of the displayed still image, and, then, to change a display state into one in which a specific spatial area is magnified in detail. Moreover, it is also possible to display a frame, which was already displayed, again (the function of displaying the past, or time shift display function).

Figure 26:
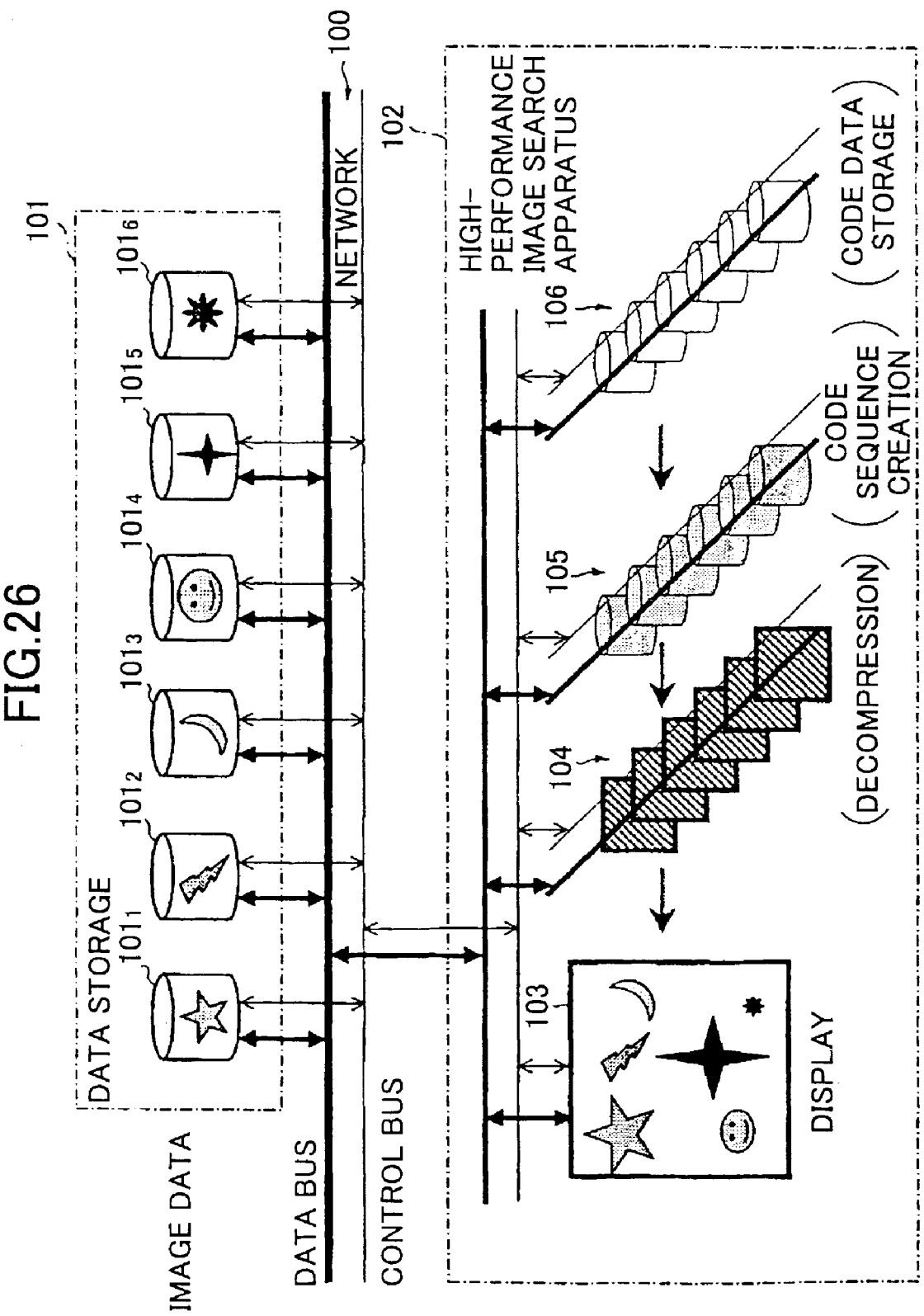
FIG. 26 illustrates another example of one embodiment of the present invention.

Furthermore, by combining in various ways the above-described features of the first through sixth embodiments, it becomes possible to perform a search of a large amount of image content or animation image content within an effectively reduced time high accuracy (see FIG. 26). Such a feature should be very advantageous especially in a recent world in which the amount of information to handle increases exponentially.

The present invention may also be embodied by a method for image decompression that includes inputting a code sequence, storing wavelet coefficient values, decoding the wavelet coefficients, inverse-quantizing the wavelet coefficient values after being decoded, inverse-wavelet-transforming so as to change the coefficient values into pixel values, storing the pixel values after decompression, and outputting the decompressed image to a display device. Furtherr, the above-mentioned respective operations may be controlled so that each performs only on that date required for obtaining a decompressed image on a specific LL subband. Furthermore, the present invention can also be embodied in a form of a recording medium in which a software program for making a computer perform the processing procedure of the above-described still image decompression method in order to operate the computer as the above-described still image decompression apparatus (or each device of this apparatus).

Specifically, as the recording medium, a CD-ROM, a magneto-optical disc, a DVD-ROM, a FD, a flash memory, a memory stick, various ROM, RAM, or the like may be applied. Then, by providing the program for a computer to perform as a decompression apparatus according to the present invention described above after recording the program onto these recording media, realization of the functions according to one embodiment of the present invention can be easily achieved. The functions of the still image decompression according to one embodiment of the present invention can be performed by storing this program in such a recording medium, is made to be read by an information processing apparatus, such as a computer, after first writing the program in a recording medium within the information processing apparatus which is then read appropriately therefrom by a CPU for performing the respective operations of the image decompression process according to the present invention.

Figure 9:
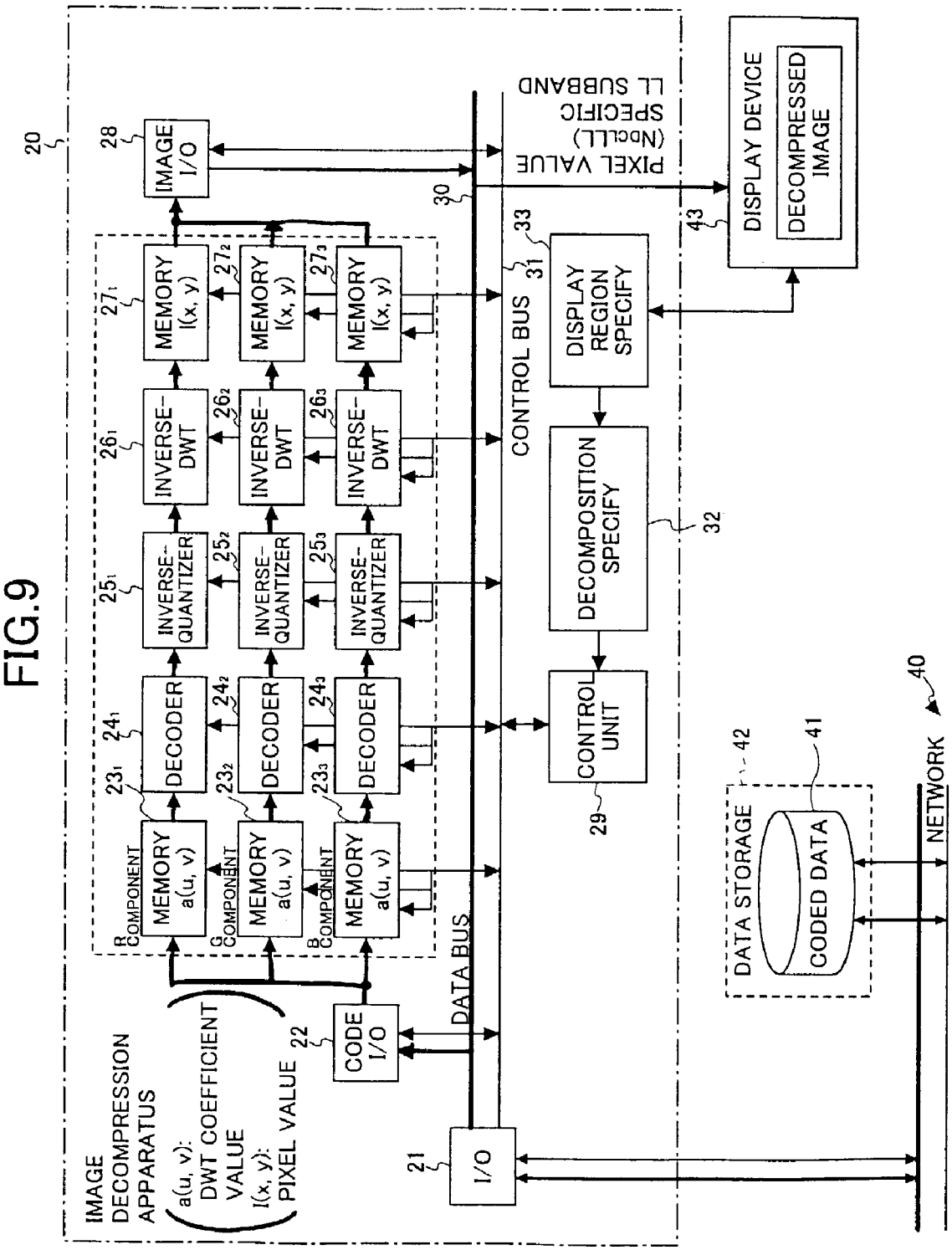
FIG. 9 illustrates one example of an image decompression apparatus according to one embodiment of the present invention.

Further specific examples of how to apply the above-described embodiments of the present invention will now be described using other embodiments, or so. FIG. 9 is a block diagram illustrating an example of a configuration of a still image decompression apparatus 20 according to a seventh embodiment of the present invention. By this embodiment shown in FIG. 9, a still image can be displayed in a reduced size state at high speed with a size-reduction rate being a power of ½.

Here, an RBG decompressed color space is assumed, and the decompression processing operation is performed in parallel with respect to the respective RGB components. A code sequence to be processed is obtained by acquiring code data stored in a storage device 41 of a data storage apparatus 42 through a communications network 40. Data and control data are transmitted through a data bus and a control bus, respectively, in the image decompression apparatus 20.

The image decompression apparatus 20 includes an I/O port 21 for receiving the code sequence, a code I/O 22 for causing the code to be input through the I/O port 21, and an image I/O 28 through which a decompressed image is output. In this apparatus, for color components R, G and B, there is included memories $23_1$, $23_2$, $23_3$ for storing wavelet coefficient values (u, v), decoders $24_1$, $24_2$, $24_3$ acting as decoding devices, inverse-equalizers $25_1$, $25_2$, $25_3$ acting as inverse quantization devices, inverse-DWTs $26_1$, $26_2$, $26_3$ acting as inverse wavelet transform devices, and memories $27_1$, $27_2$, $27_3$ acting as pixel value storing devices for storing pixel values (x, y).

In the code I/O 22, after inputting the code stream, which is a coded still image, and performing tag processing, the wavelet coefficient values in a coded form thus obtained are stored in the memory $23_1$, $23_2$, $23_3$. Then, decode processing, inverse quantization processing, and inverse wavelet transformation are respectively performed one by one on the wavelet coefficient values by the decoders $24_1$, $24_2$, $24_3$, the inverse quantizers $25_1$, $25_2$, $25_3$, and the inverse wavelet transform devices $26_1$, $26_2$, $26_3$. The pixel values of the decompressed image obtained by the processing are stored in buffer memories $27_1$, $27_2$, $27_3$. finally, color conversion processing is performed in an image I/O 28, and the pixel values obtained from the coefficient values on a low frequency LL subband are output as display image data to a display device 43.

On the other hand, a suitable decomposition level is selected by a decomposition level specification device 32 based on a rate of size reduction obtained from a ratio of a display region specified on the display device 43 and the size of an original image, by a display region specification device 33. Thus, a size-reduced animation can be displayed at high speed. Alternatively, as mentioned above, the display region specification device 33 may not be provided, and, instead, the decomposition level determination device 32 may be used for directly specify the decomposition level to be applied.

Figure 10:
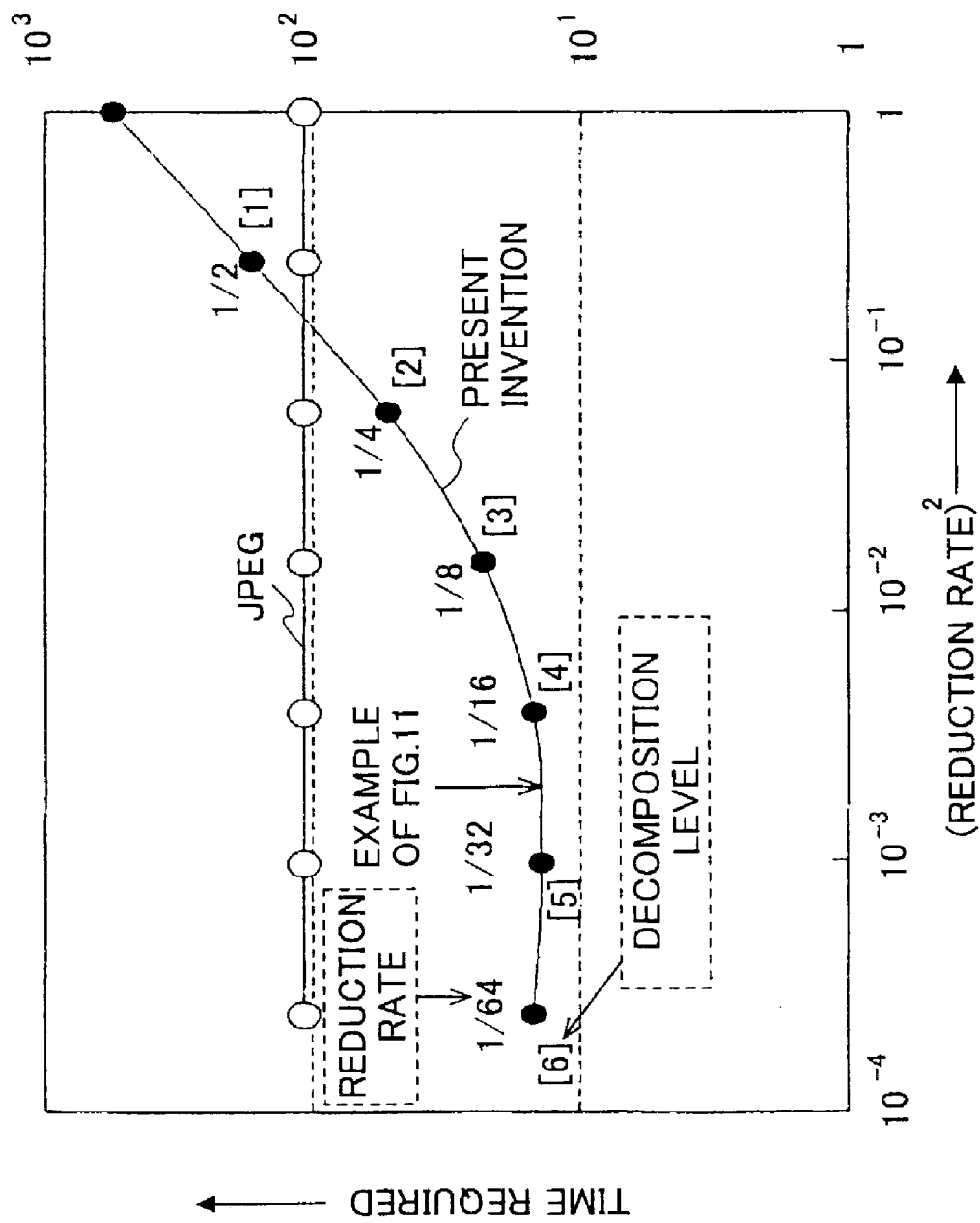
FIG. 10 illustrates a change in time required for decompressing a JPEG-compressed sample image data with respect to a size-reduction rate on an image display according to one embodiment of the present invention.

FIG. 10 shows the time required, using the still image decompression apparatus according to the seventh embodiment of the present invention described above, for a display when performing a decompression operation required for providing a decompressed image on a specific LL subband. Code data applied in this example is a code stream encoded by the JPEG2000 method. As the deeper a subband to be applied becomes, in other words, as the reduction rate becomes larger, the advantage of the present invention increases in comparison to the conventional JPEG method. This tendency becomes more distinguishable as the original image becomes larger in size or higher in definition/resolution. As can be seen from FIG. 10, the time required can be reduced by approximately one digit when the reduction rate becomes more than 10.

Figure 11:
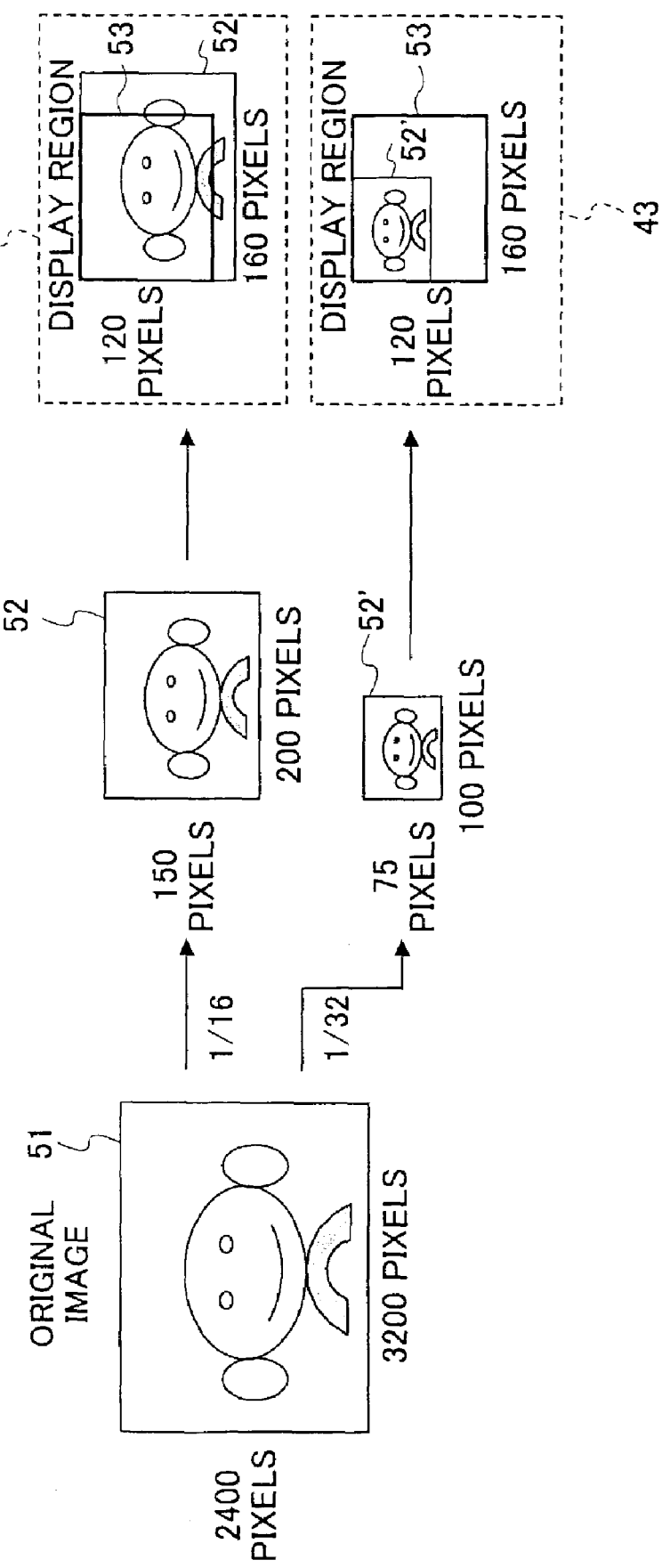
FIG. 11 illustrates a scheme of displaying a size-reduced image within a specified display region on a display device according to one embodiment of the present invention.

FIG. 11 illustrates an example of a case of a display of an original image with size reduction at high speed in a display region specified in the still image decompression apparatus shows in FIG. 9. In this example, the size of the original image 51 is 3200 pixels (width)×2400 pixels (length) while the display region 53 on the display device 43 is 160 pixels (width)×120 pixels (length). The size of this display region 53 has a rate of size reduction intermediate between 1/16 and 1/32, as shown by an arrow in FIG. 10.

In such a case, there are three types of methods as how to choose a specific LL subband to be actually selected, as mentioned above. That is, in case an immediately larger LL subband than the display region 53 is selected, the top right state occurs. In the case where an immediately smaller LL subband than the display region 53 is selected, the bottom right state occurs. In the case where a nearest LL subband than the display region 53 is selected, the top right state occurs. In FIG. 11, decompressed images 52 and 52' correspond to those obtained in cases where the LL subbands are selected as mentioned above with reference to the top right and bottom right states, respectively.

Figure 12:
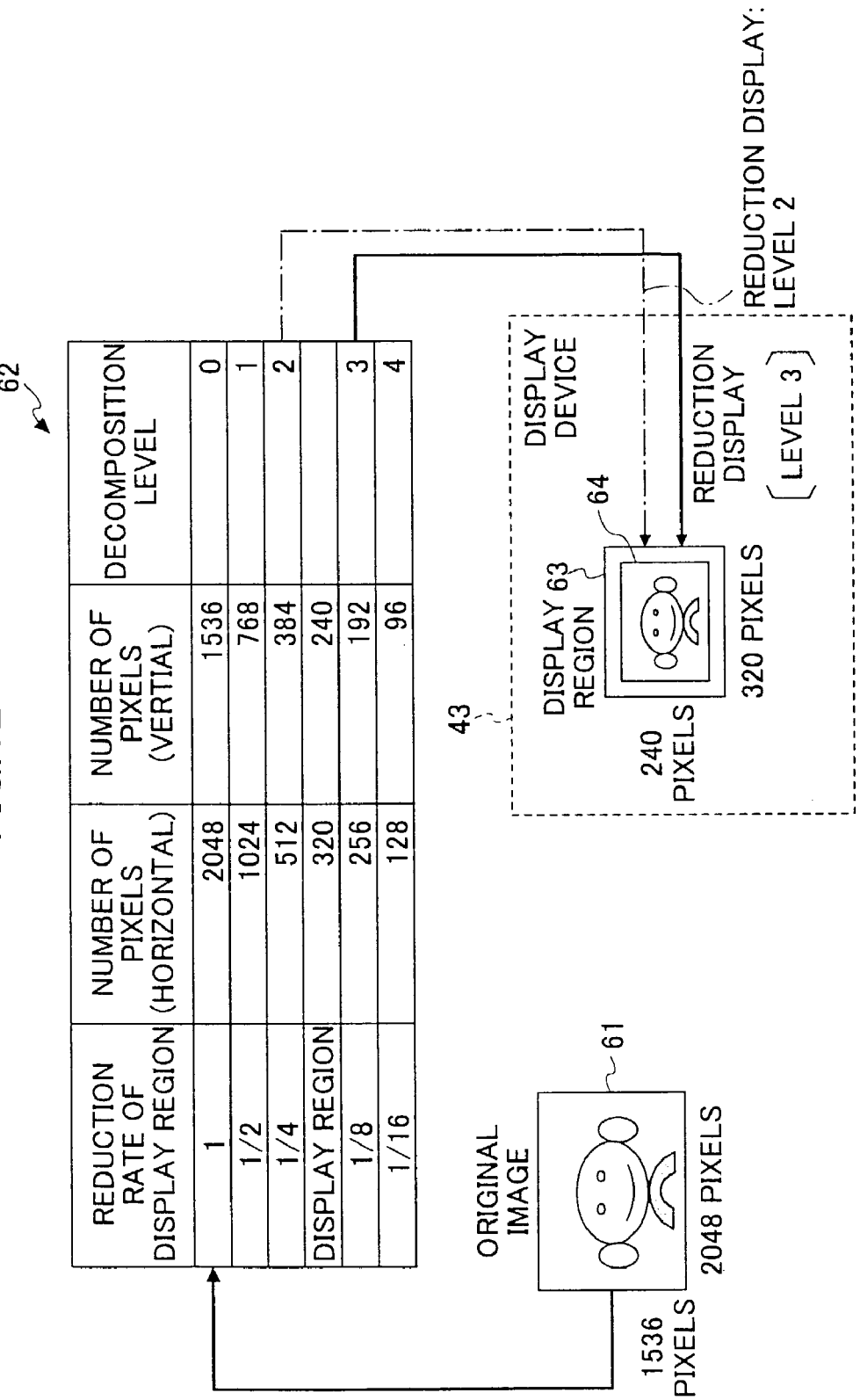
FIG. 12 illustrates a scheme of how to determine a decomposition level to be applied when displaying a size-reduced image within a specified display region on a display device according to one embodiment of the present invention.

FIG. 12 illustrates a method of how to determine a specific LL subband to be actually selected for a display with size reduction at high speed within a display region specified in the still image decompression apparatus described above. The example of FIG. 12 shows a case where an original image 61 whose number of pixels of width and length are 2048 pixels×1536 pixels is displayed with size reduction to 320 (width) pixels×240 pixels (length) of the display region 63. Based on the level calculating table 62 shown, the decomposition level (level 3) nearest to the display region with respect to the number of pixels, the decomposition level (level 2) smaller than and nearest to the display region with respect to the number of pixels, and the decomposition level (level 3) larger than and nearest to the display region with respect to the number of pixels may be selected, respectively, by calculation.

Figure 13:
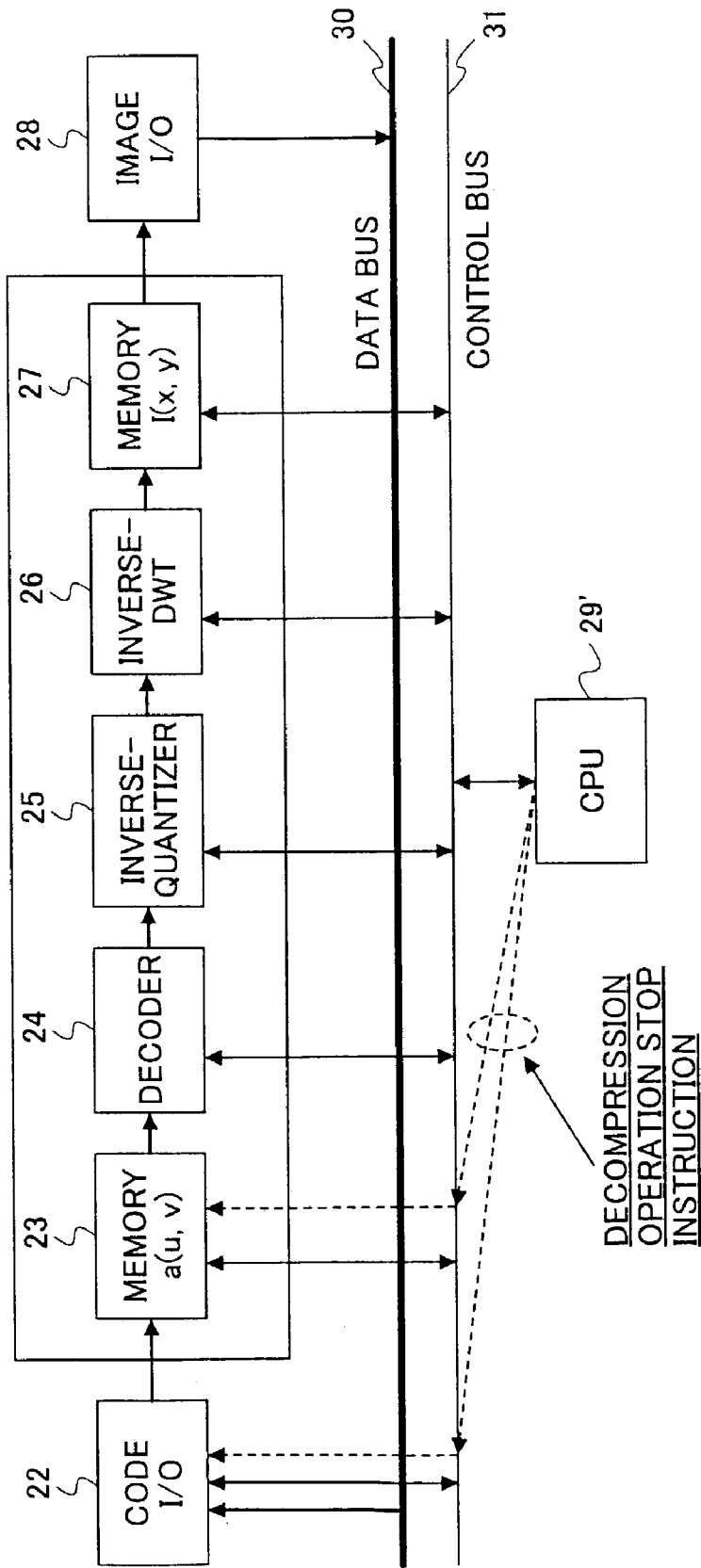
FIG. 13 illustrates a scheme of controlling each functional parts of the image decompression apparatus so as to prevent operations from being performed on code sequence parts irreverent to a decompressed image on a specified LL subband according to one embodiment of the present invention.

In a still image decompression apparatus according to an eighth embodiment of the present invention shown in FIG. 13, a functional module control is performed such that the decompression operation only required for providing a decompressed image on a specific LL subband is performed. Specifically, illustrating a basic principle, a CPU 29' performs a control on a code I/O 22 for inputting code data and on a memory 23 for storing wavelet coefficient values, such that only code data needed for decompressing for the specified decomposition level is input or stored there, and, input or storage of the other parts of code data is avoided. Thus, by limiting the code data to be processed to a predetermined minimum necessary amount, it becomes possible to display a large-size high-definition image at high speed.

Figure 14:
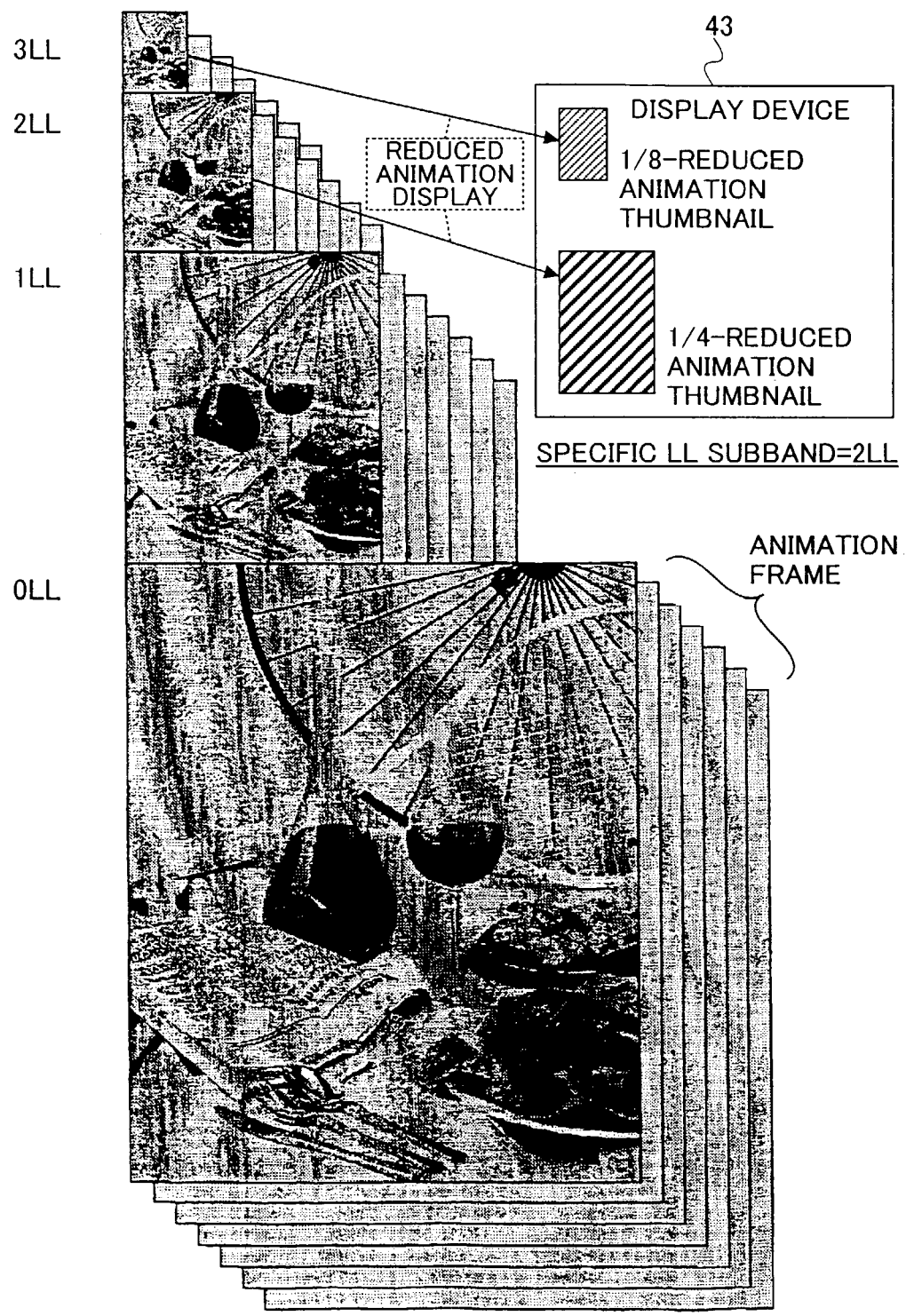
FIG. 14 illustrates a scheme of displaying animations according to one embodiment of the present invention.

FIG. 14 illustrates a method according to one embodiment of the present invention to display animation which has frames formed of successive still images, at height speed. Images 0LL of animation shown in FIG. 14 are original images themselves. In this example, as the decompression operation is performed only for the specific 2LL subband on a lower frequency side, and, thus, further decompression operations for the 1LL subband are not performed, the necessary decompression operation can be completed within an effectively reduced time. As a result, thumbnail animation images reduced in size to ¼ the size of the original image can be displayed smoothly at high speed without frame omission, without applying heavy load onto a MPU/DSP/special LSI which takes charge of performing the decompression operation.

Furthermore, by storing pixel values on the 3LL subband occurring intermediately during the decompression operation for the 2LL subband separately, it is also possible to simultaneously display a plurality of sets of thumbnail animation images reduced in size to ¼ and ⅛ the size of the original image on the same display 43.

It may be possible to generate a display such that, normally, a large image reduced in size to ¼ is not displayed while only a small image reduced in size to ⅛ the size of the original image is always displayed. In this case, according to a special request by a user, the large image of reduced in size to ¼ the size of the original image may be optionally displayed.

As mentioned above, the amount of the code stream required for the decompression becomes smaller remarkably as the reduction rate becomes larger. Accordingly, by omitting the decompression operation on the code stream not required for reproducing a relevant reduced size image, and, also, omitting even inputting or storing the unneeded part of code stream, it becomes possible to achieve a further quick display of high-definition image.

Figure 15:
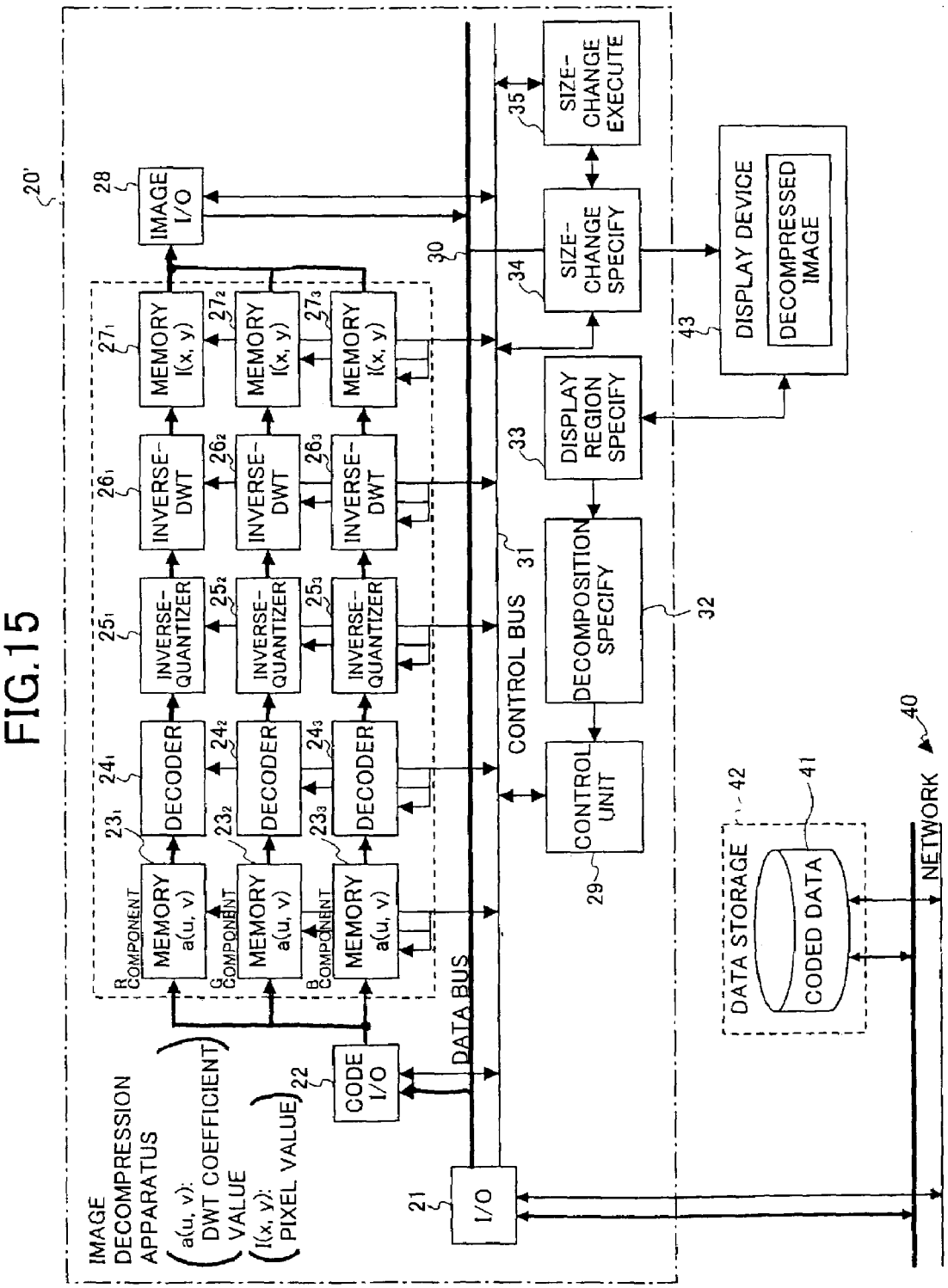
FIG. 15 illustrates another example of one embodiment of the present invention.

FIG. 15 is a block diagram illustrating a configuration of a still image decompression apparatus 20' according to a ninth embodiment of the present invention. In this embodiment, different from the embodiment shown in FIG. 9, an image reduction rate other than a power of ½ can be performed. For this purpose, two functional modules, i.e., a size change specification device 34 and a size change device 35 are added. In cases where a display area obtained from a specified decomposition level is smaller than a specified display region, a magnification operation is performed as a size change operation. Similarly, in cases where a display area obtained from a specified decomposition level is larger than a specified display region, a size-reduction operation is performed as a size change operation. The magnification and size-reduction operations are specifically achievable by an interpolation operation and a thinning-out operation, respectively, which are well known.

Specifically, in the example described above with reference to FIG. 12, in cases where the specific LL subband is 3LL, as the display size resulting therefrom is smaller than the specific display size, interpolation is performed. On the other hand, in case the specific LL subband is 2LL, as it is larger than the specific image display region, a thinning-out operation is performed for fine adjustment in image size.

Figure 16:
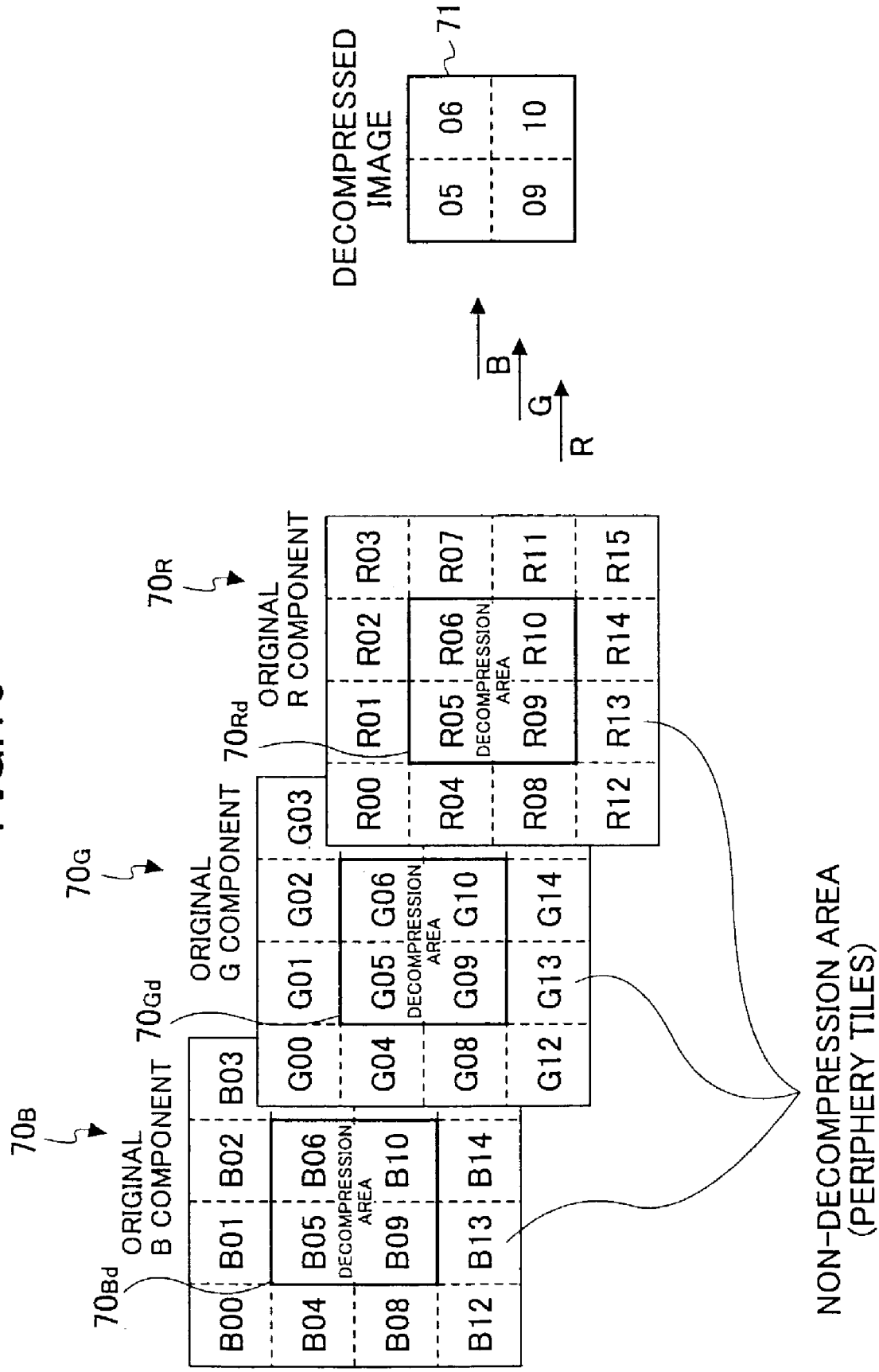
FIGS. 16 and 17 illustrate a scheme of controlling decompression within a central part of an original image according to one embodiment of the present invention.
Figure 17:
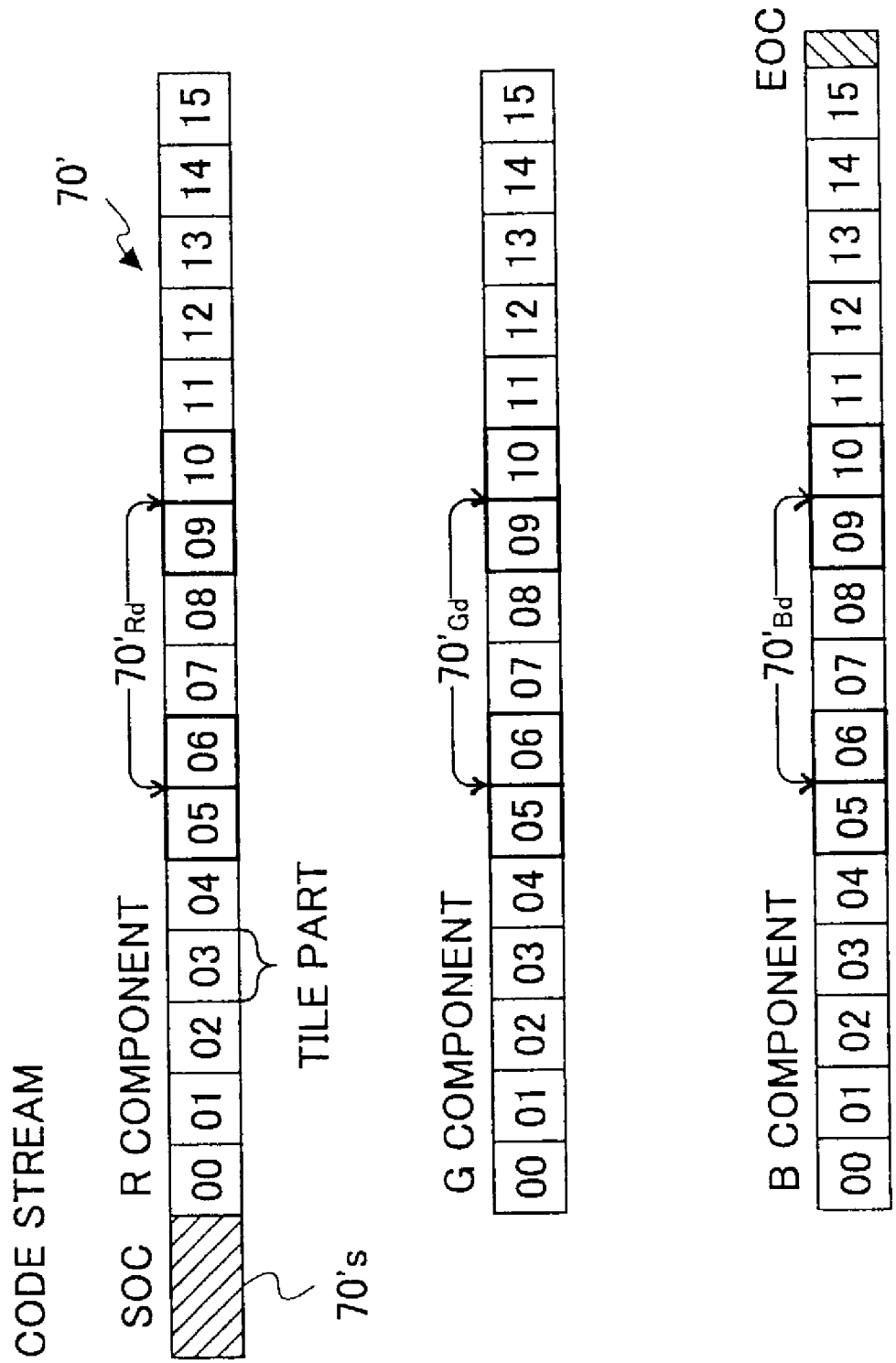

FIG. 16 illustrates a scheme according to one embodiment of the present invention in which a spatial area of an original image to be decompressed is limited only to a central area. FIG. 17 illustrates code streams corresponding to the limited area to be decompressed. By specifying the area to be decompressed beforehand, it becomes possible to effectively reduce the time required for the relevant decompression operation. Specifically, an area 70Rd, 70Gd, and 70Bd (tile numbers 05, 06, 09, and 10) corresponding to a central part of an original image are decompressed from among color component data 70R, 70G and 70B on 16 respective tile areas each for R, G, and B color components. Thus, the decompressed data 71 is created.

For this purpose, in the original code stream 70' shown in FIG. 17, any codes other than those on the relevant four tiles for each color component, i.e., codes 70'Rd, 70'Gd, and 70'Bd, should not be decompressed. Specifically, information described in the header 70's in the head of the code stream 70' is read, the codes corresponding to the relevant tiles are identified thereby, and, thus, only the necessary codes are accessed, and decompressed, tile by tile. Thus, by effectively limiting the codes to be processed only to those corresponding to the specific spatial area of the original image, it becomes possible to further effectively reduce the time required for achieving a relevant display. Generally speaking, in an image, essential information is included in a central portion in many cases. Accordingly, such a method of limiting a spatial area to be decompressed to a central area is effectively advantageous in many cases.

Figure 18:
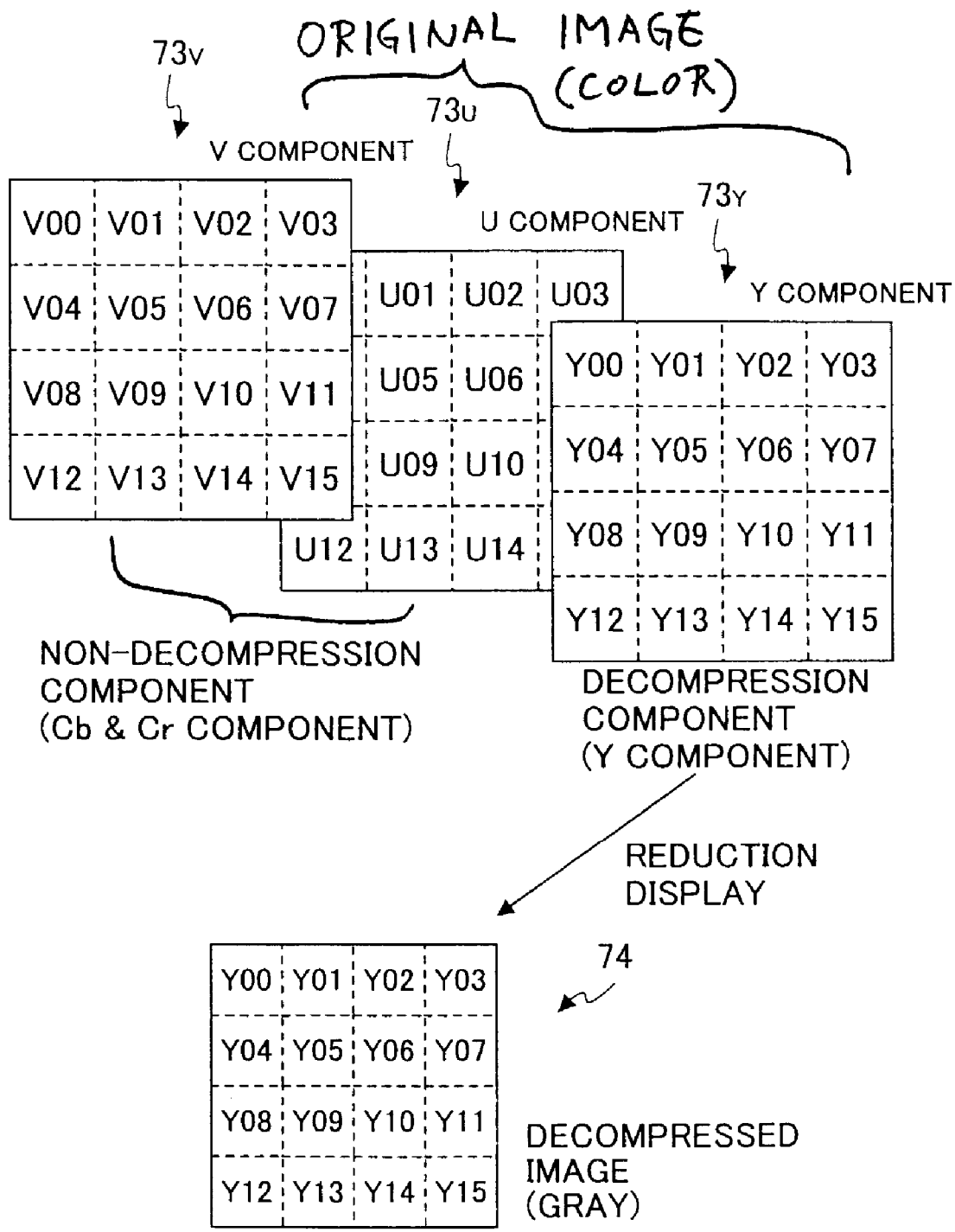
FIGS. 18 and 19 illustrate a scheme of controlling decompression within a specific component with respect to a color space of an original image according to one embodiment of the present invention.
Figure 19:
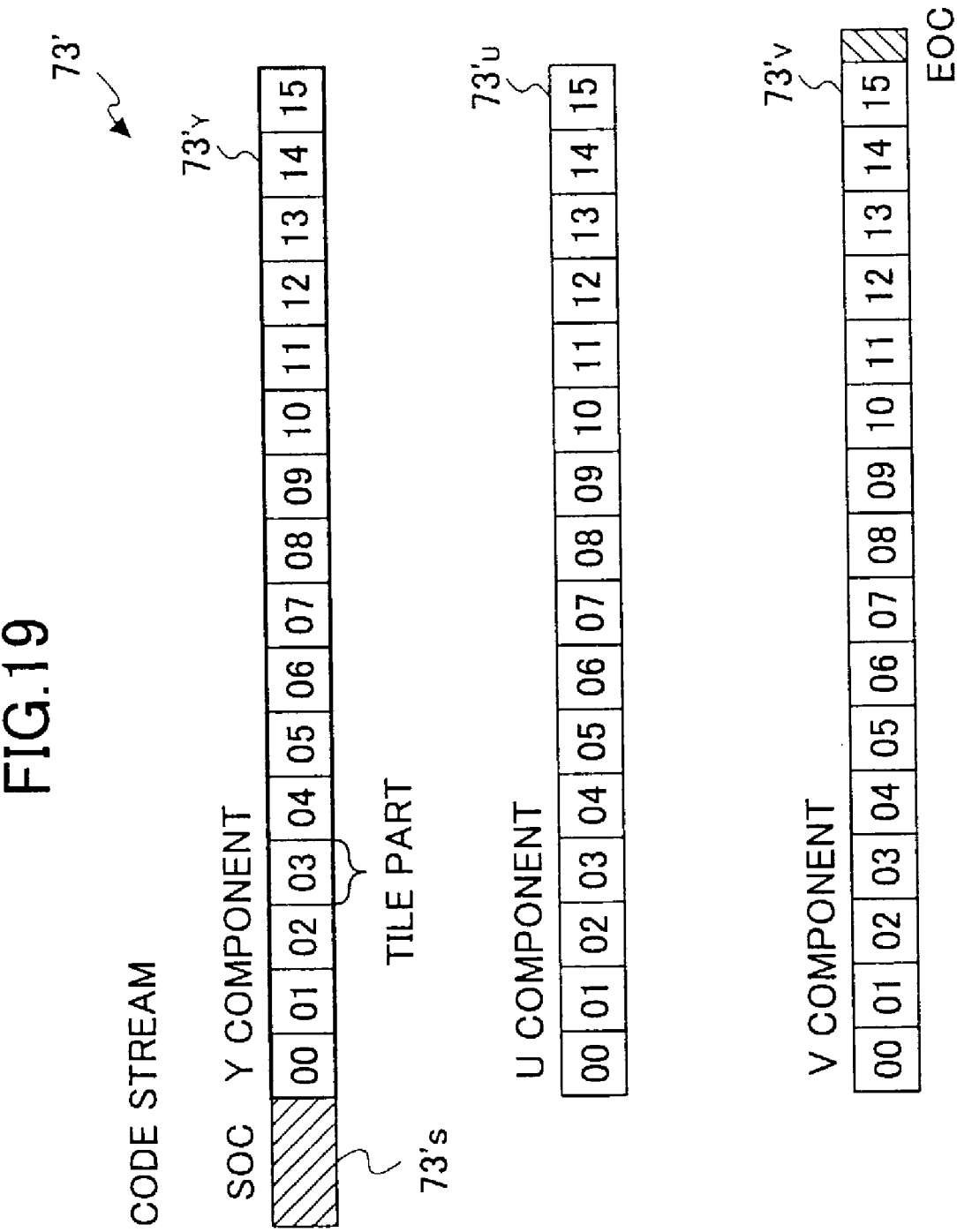

FIG. 18 illustrates a scheme according to one embodiment of the present invention in which only a luminosity component of color-space components of original image is selectively decompressed. FIG. 19 illustrates code streams corresponding to the limited scope of code data. In this case, a gray scale image is displayed from an original color image data. For this purpose, the code stream is reduced into the scope of the luminosity component from among the three components of the original scope. That is, the processing which decompresses only the luminosity component 73Y is performed from among the Y, U, and the V components 73Y, 73U, and 73V.

With reference to FIG. 19, decompression is performed on the code stream other than U, V components, from among those 73' (SOC73'S, 73'Y, 73'U, 73'V, and EOC, in the stated order). Thus, only the Y component is decompressed among the YUV components of the color original image in this case. Accordingly, an image displayed thereby becomes gray as opposed to color. The display speed improves compared with the case of displaying with color. Access to the codes corresponding to the luminosity component in the code stream is achieved based on a result of interpretation of the header information.

Figure 20:
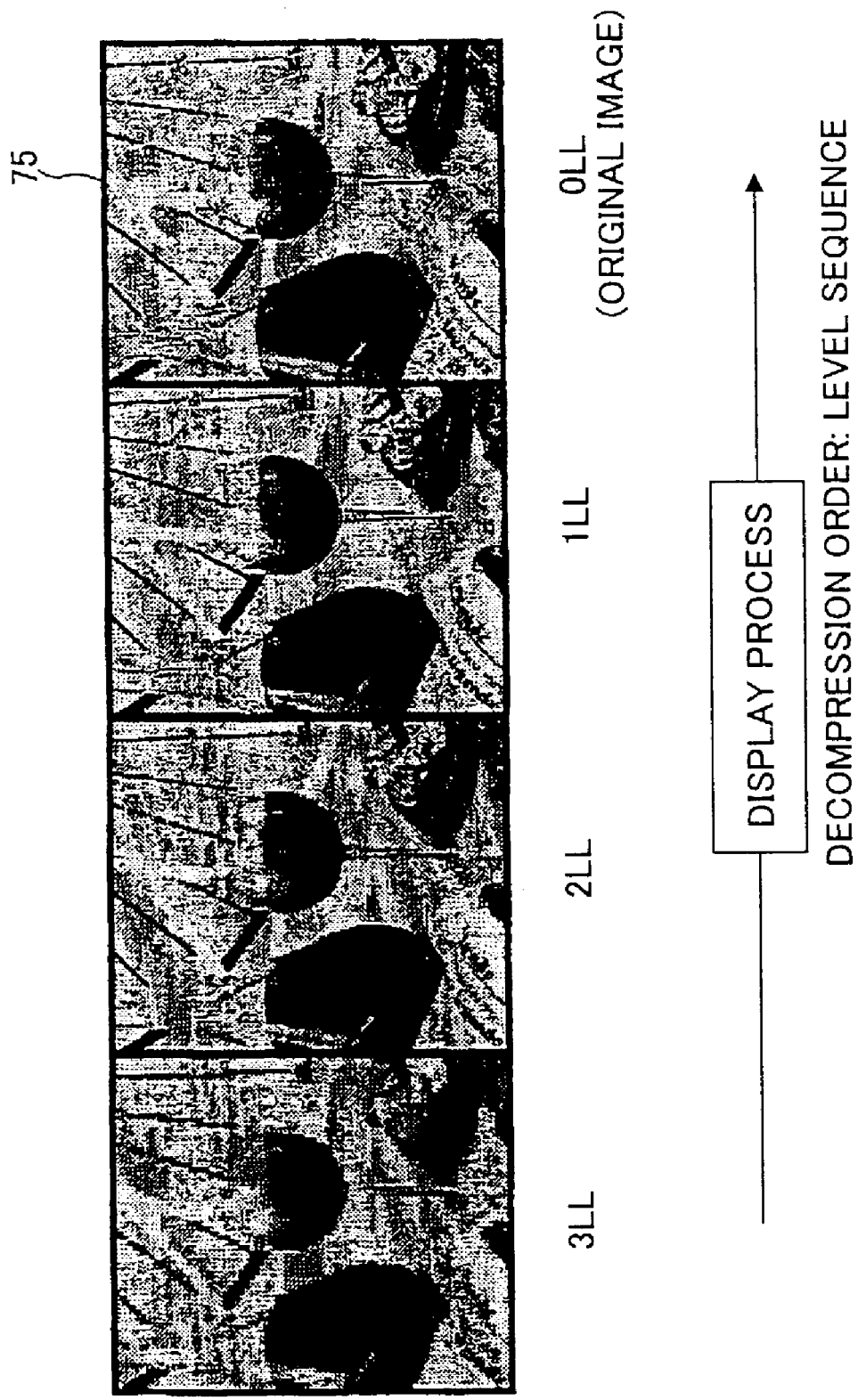
FIG. 20 illustrates decompression being performed according to an order of decomposition levels according to one embodiment of the present invention.

FIG. 20 illustrates a scheme according to an embodiment of the present invention in which the decompression operation order is set according to the order with respect to the decomposition levels in DWT. Specifically, FIG. 20 shows how a displayed image changes as the decompression operation proceeds. In fact, in this case, the order of codes in a code stream to be processed is such that, first, a highest decomposition level is decompressed, then, second decomposition level is decompressed, . . . , and finally, the lowest/shallowest decomposition level is decompressed. Accordingly, first, wavelet coefficient values on a decomposition level having a larger level number are decoded. As a result, a coarse image occurs first, and, then, gradually, a finer image occurs. Finally, an image 75 occurs which corresponds to the original image (finest). As another order to be applied, an order of layers with respect to bit planes may be applied.

Figure 21:
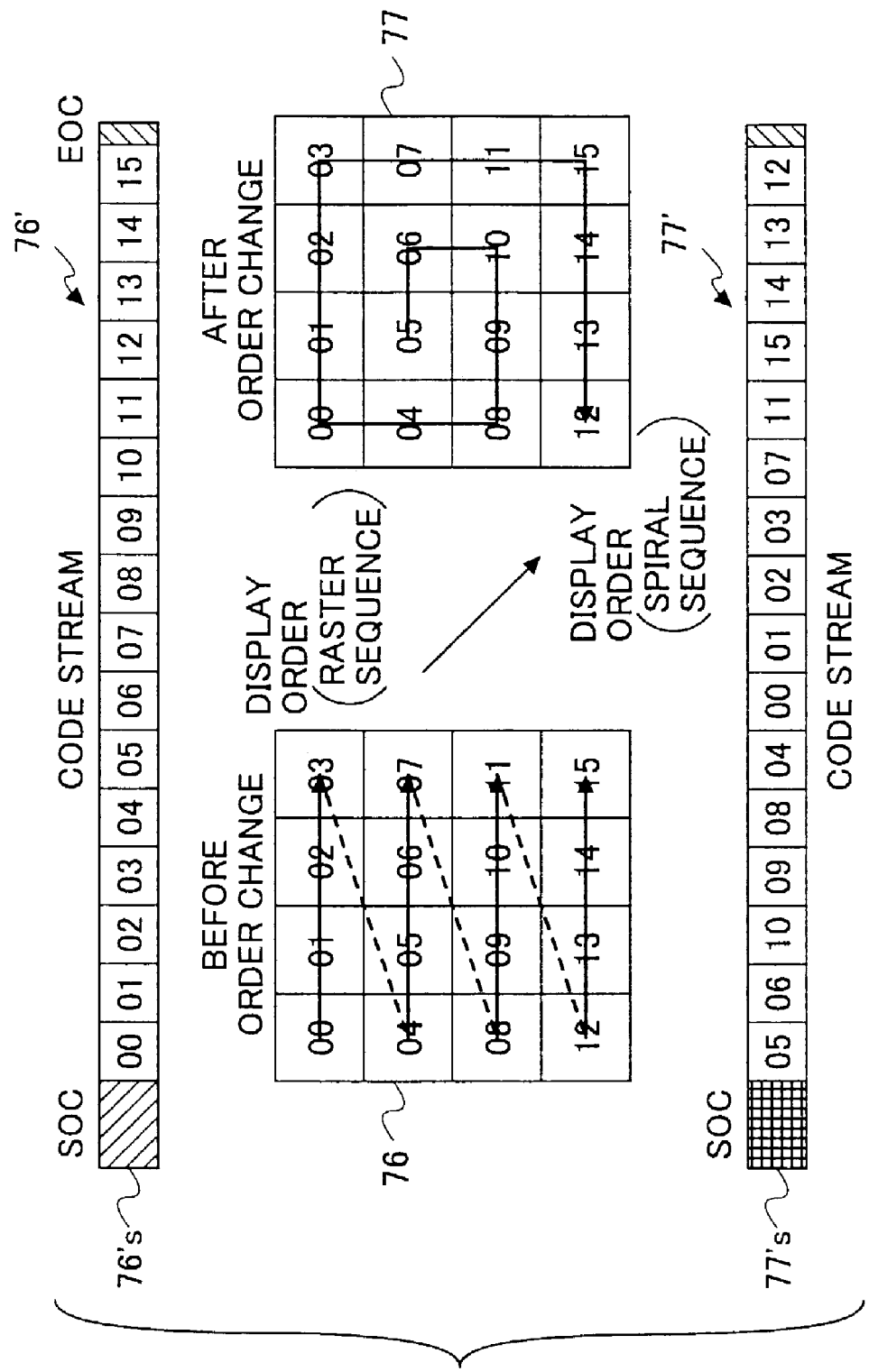
FIG. 21 illustrates decompression being performed according to an order of tiles, changed from a raster order to a spiral order, according to the present invention.

FIG. 21 illustrates a scheme according to one embodiment of the present invention in which an order of display with respect to tiles is applied. In the example shown in FIG. 21, the display order of the codes corresponding to respective tiles is changed into "the order of spiral" from "the order of raster." For this purpose, merely changing the order to be decoded described in the header 76'S of the code stream 76' could do. However, in order to improve the display speed, it is preferable that the order of the codes themselves in the code stream should be preferably changed according to the order of display. That is, from the order shown at the top of FIG. 21 should be changed into the same shown at the bottom of FIG. 21. This method of spreading the display region toward the circumference from the central part of an image is advantageous as, generally speaking, there is a tendency that essential information is concentrated at a center of image in many cases, as mentioned above.

As mentioned above, by providing a predetermined priority on respective codes beforehand, and interpreting the priority by reading the tag information, the decompression order can be arbitrarily controlled. However, in this method, the process of accessing the respective codes in the code stream becomes complex, and, thus, decompression speed may be degraded. In order to solve such a problem, it is preferable to provide a device in front of the decompression apparatus for appropriately re-arranging the packet sequence in the code stream beforehand. The above-mentioned code sequence 77' shown in FIG. 21 is of a new code stream created by thus appropriately re-arranging the packet sequence so that the display order of tiles is changed into the spiral order from the raster order. In this scheme, display speed is prevented from being degraded.

Figure 22:
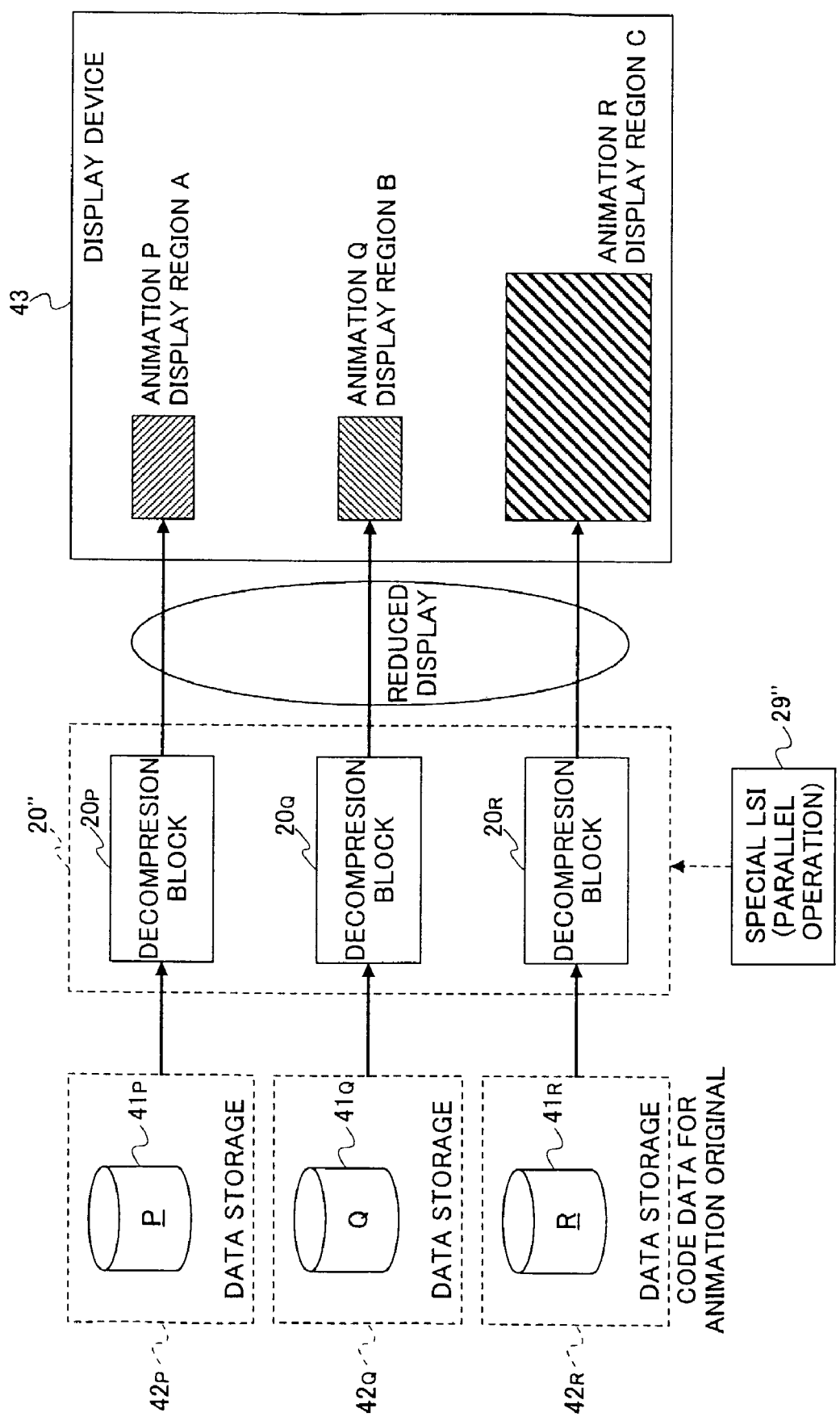
FIG. 22 illustrates a scheme of displaying a plurality of animations on a same display device at once according to one embodiment of the present invention.

FIG. 22 illustrates a scheme according to one embodiment of the present invention in which a plurality of animations with reduced sizes are displayed on a same display device at once at high speed. In an example of FIG. 22, animation image data stored beforehand in storage devices 41P, 41Q, and 41R of data storage apparatus 42P, 42Q, and 42R are read therefrom, and are displayed with reduced sizes on the same display device 43 at high speed using an image decompression apparatus 20" according to a tenth embodiment of the present invention.

In this scheme, by using a special LSI 29" in the decompression apparatus 20", parallel operation is performed for every animation frame. When a number of circuit blocks required for decompression circuit blocks 20P, 20Q, and 20R cannot be contained in a single chip, several chips are provided to contain them, which are made to operate in parallel. In this example, a parallel decompression operation scheme is applied for every frame of an animation. However, other than this example, it is also possible to apply a parallel decompression processing schema for every tile or every color-space component. Such a scheme is believed to be very advantageous in terms of further effectively reducing the time required for achieving a display of a large-size, high-definition still image.

Figure 23:
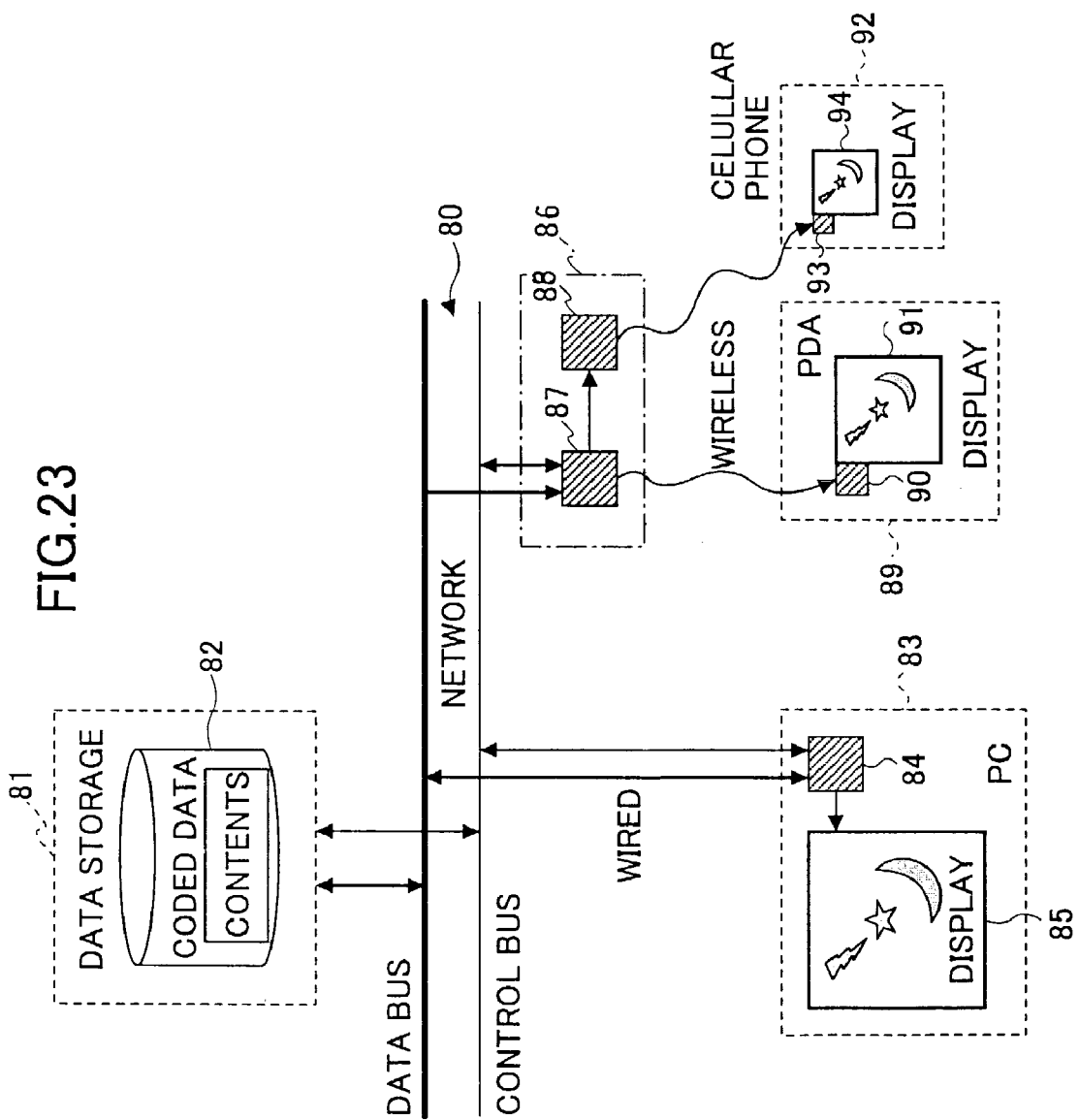
FIG. 23 illustrates a scheme of enabling a display of common contents through a plurality of display devices having different display sizes according to one embodiment of the present invention.

FIG. 23 illustrates an image providing system according to an eleventh embodiment of the present invention. In this system, still image decompression apparatuses according to the present invention are applied for various sizes of display devices at once. Thereby, the same image contents can be viewed through the various sizes of display devices. A display device 91 or 94 and an LSI circuit of a PDA 89 or a cellular phone 92 which is a portable device are restricted strictly in terms of physical shape and power consumption. In term of physical shape, since difference in display area is large from an original image stored in a data storage device 82 of a data storage apparatus 81, the rate of size reduction may be increased accordingly. However, in term of power consumption, it is preferable to reduce the amount of operation required for a display as much as possible. A solution which satisfies both the requirements is to use only LL subband coefficients of a deep decomposition level in DWT for a mobile device, from among the original image contents.

The code sequence creation apparatus 86 shown has functionality for extracting such deep subband coefficients suitable for a small area display, and for creating a code stream therefrom. In this example, the code sequence creation apparatus 86 includes two stages of such deep subband coefficient extracting processes suitable for devices having different display sizes which require different size reduction rates accordingly.

Specifically, a code sequence for the decomposition level 2 is created by a code sequence creation device 87 for the PDA 89 while a code sequence for the decomposition level 3 is created by a code sequence creation device 88 for the cellular phone 92. Thus, in this system, the code data of the original contents is sent to a PC 83, as it is, via a network 80, while, new code sequences for the respective decomposition levels 2 and 3 are created for the PDA 89 and cellular phone 92, which are then sent thereto via radio, respectively. Since the decoding operation can be made to the minimum by this scheme, the power consumption can also be effectively minimized.

In the PC 83, the sent data is decompressed by an image decompression apparatus 84 embedded therein. On the other hand, in the cellular phone 92 and PDA 89, by receiving via radio the outputs of the code sequence creation device 86, they are decompressed by an image decompression apparatus 90 or 93 embedded in the display 91 or 94 in the PDA 89 or the cellular phone 92. Thus, they can be displayed at high speed. Such a code sequence creation apparatus may instead be embedded in the cellular phone, PDA, PC, itself, or the like.

Figure 24:
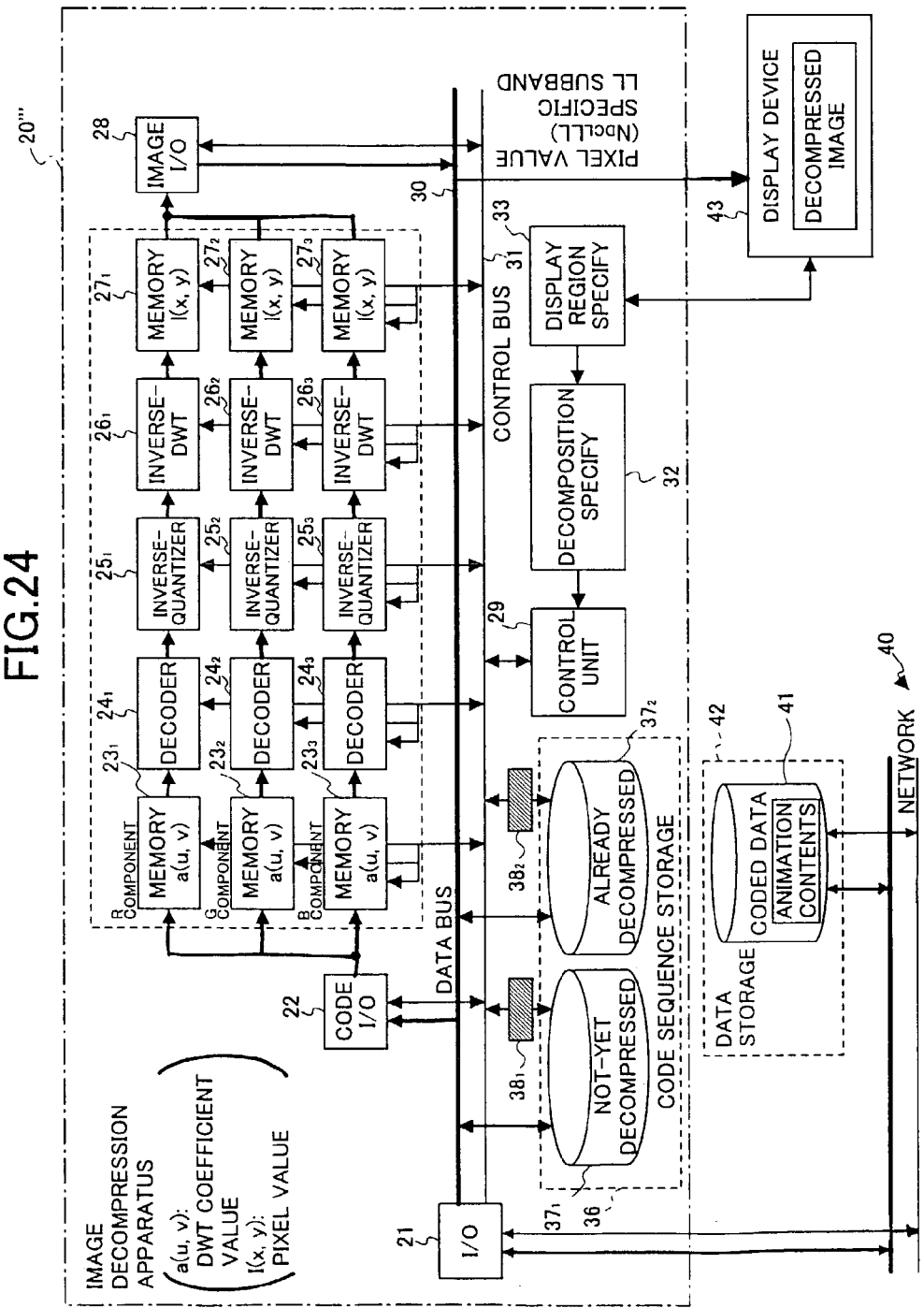
FIG. 24 illustrates another example of one embodiment of the present invention.
Figure 25:
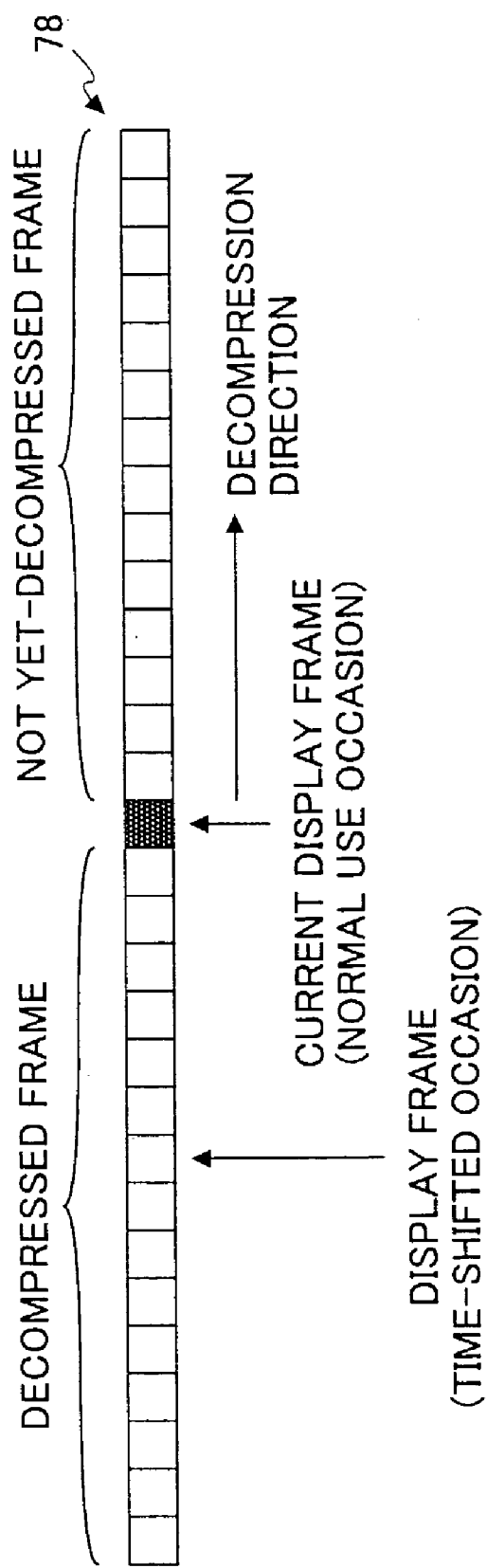
FIG. 25 illustrates a time-shift display scheme according to one embodiment of the present invention.

FIG. 24 is a block diagram showing a configuration of a still image decompression apparatus according to a twelfth embodiment of the present invention. FIG. 25 illustrates a time-shift display function in this concern. As shown in FIG. 24, the image decompression apparatus includes a hard disk drive 36 as a code sequence storage which stores code data for a specified number of un-decompressed frames, or code data for a specified number of decompressed frames.

The code sequence storage 36 includes a memory device $37_1$ to store the not-yet decompressed frame and a memory device $37_2$ to store already-decompressed frames. Further, a frame number specification device 38 is connected thereto. One specific function of this decompression apparatus 20''' is a time-shift display function in animation display. This function is such that the currently displayed frame is shifted into a desired past frame (already displayed frame), as shown in FIG. 25. By employing this function in an animation display occasion, in case a user wishes to view a once-displayed scheme again in detail, it becomes possible to return to the relevant frame. Furthermore, it is also possible to change a display mode from an animation mode into a still image display mode at a specific frame, and, then, to reduce the size reduction rate therefor, in order to study the relevant image in detail.

Moreover, by storing not-yet-decompressed frames of an animation in advance in the storage device 36 in cases where a relevant animation image data is sent from a code data storage apparatus via a communications network, it becomes possible to ensure a stable display of decompressed images for the animation.

FIG. 26 shows an image providing system according to a thirteenth embodiment of the present invention. As shown, the image providing system provides a "highly efficient image search apparatus" which employs, in addition to a still image decompression apparatus according to the present invention, the above-mentioned device for achieving parallel operation, and a device 106 for storing code data. This system is a system by which a search of image content in detail within a short time can be achieved.

In this system, a code sequence creation apparatus 105 is provided for creating code sequences (for example, suitable for display of thumbnail images, thumbnail animation, and so forth, see FIGS. 14 through 21, for example) suitable for search operations in front of the image decompression apparatus 104. The image decompression apparatus 104 can thus be free from performing interpretation of complicated header information, and complicated access to specific code parts in a given code sequence. Thus, the decompression operation can be made at high speed as a result. As shown, a data storage device 101 may include a group of storage devices $101_1, 101_2, 101_3, \ldots$ to which the contents are stored in a sharing manner for every type of image data contents.

Figure 27:
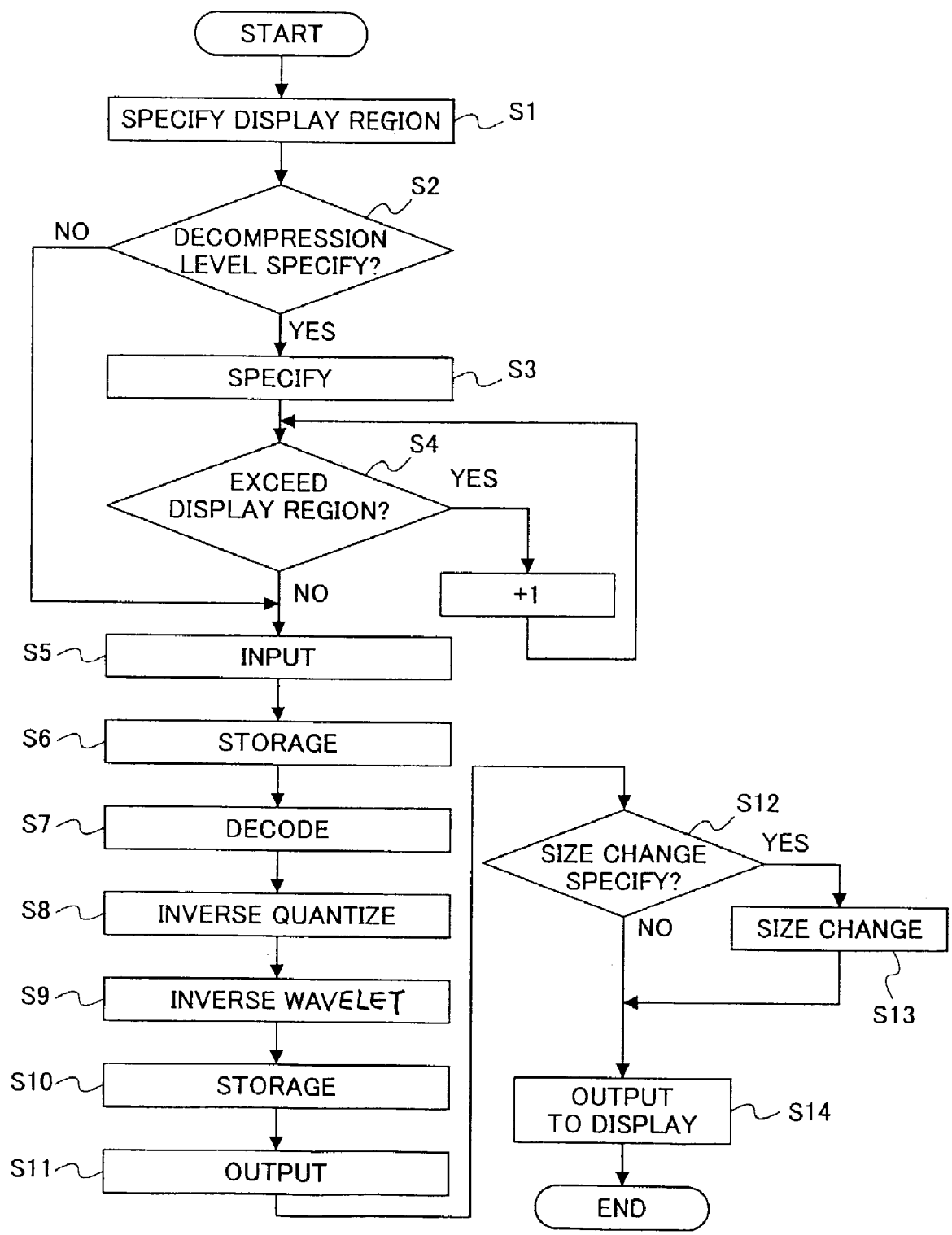
FIG. 27 shows an operation flow chart illustrating an image decompression method according to one embodiment of the present invention.

FIG. 27 is a flow chart illustrating a still image decompression method according to one embodiment of the present invention. As an example, how to display pixel values with size reduction at high speed in an image display region specified on a display device will be described. First, wavelet coefficient values are taken from a set starting from the deepest decomposition level (having the largest level number) not exceeding a specified decomposition level. Then a decoding process and the following processes are performed thereon within a scope necessary for a predetermined specified LL subband.

First, a display region on a display device is specified (in a step S1). Then, it is determined whether or not a decomposition level is specified (in a step S2). When it is specified, the specified decomposition level is set in a step S3. Then, when the size of decompressed image to be obtained from an LL subband on the thus-set decomposition level exceeds the size of the display region specified in the step S1, the decomposition level is incremented by 1 so that the size obtained therefrom is one step reduced accordingly (see FIGS. 3A through 3D).

This operation is repeated until the size of decompressed image to be obtained from the LL subband on the set decomposition level becomes equal to or less than the size of the display region specified in the step S1. Next, a code stream is input (in a step S5), and wavelet coefficient values thereof are stored in a memory (in a step S6). Then, decode processing (in a step S7), inverse quantization processing (in a step S8), and inverse wavelet transform processing (in a step S9) are performed so that the decompressed image on the LL subband set through the above-mentioned loop of steps S3 and S4 be obtained, and obtained pixel values are stored in a memory (in a step S10).

These pixel values are output (in a step S11), and size change processing (in a step S13) is performed if necessary after checking whether or not the size change is to be performed (in a step S12), and the result is output to a display device (in a step S1). However, as mentioned above, there are three ways of specifying the decomposition level to be applied, that is, to select the immediately larger one, to select the immediately smaller one, or to select the nearest one.

Further, the present invention is not limited to the above-described embodiments, and variations and modifications may be made without departing from the basic concepts of the present invention.

What is claimed is:

1. An image decompression apparatus, comprising:
an input unit to input a code sequence of wavelet coefficients;
a decoding unit to decode the input code sequence;
an inverse-quantization unit to perform inverse-quantization on the decoded wavelet coefficients;
an inverse-wavelet-transform unit to perform inverse wavelet transform on the inverse-quantized wavelet coefficients so as to obtain pixel values;
a control unit to control operations of the input unit, the decoding unit, the inverse-quantization unit, and the inverse wavelet transform unit to limit operations into those such that a decompressed image of a specific LL subband be obtained therefrom;
a display region specifying unit to specify a display region on a predetermined display device using a number of pixels in a vertical direction or a number of pixels in a horizontal direction; and
a decomposition level determining unit to determine a decomposition level, on which level the specific LL subband occurs, based on the display region specified by the display region specifying unit.

2. The image decompression apparatus as claimed in claim 1, further comprising:
a storage unit to store pixel values of LL subbands occurring intermediately during decompression which is performed to obtain the decompressed image of the specific LL subband.

3. The image decompression apparatus as claimed in claim 1, wherein the still images decompressed image comprises frames of an animation.

4. The image decompression apparatus as claimed in claim 1, wherein the code sequence comprises a code stream coded according to JPEG2000 (ISO/IEC FCD 15444-1).

5. The image decompression apparatus as claimed in claim 1, further comprising:
a size-change specifying unit to specify a size-change operation; and
a size-change execution unit to perform the size-change operation by use of a pixel-value interpolation or a thinning-out operation performed on the decompressed image of the specific LL subband on the decomposition level selected.

6. The image decompression apparatus as claimed in claim 1, wherein:
the decomposition level on which the specific subband occurs is determined such that the decompressed image of the specific subband is nearest in image size to the display region measured by the number of pixels for the display region specified.

7. The image decompression apparatus as claimed in claim 1, wherein:
the decomposition level on which the specific subband occurs is determined such that the decompressed image of the specific subband is larger than and nearest in image size to the display region measured by the number of pixels for the display region specified.

8. The image decompression apparatus as claimed in claim 1, wherein:
the decomposition level on which the specific subband occurs is determined such that the decompressed image of the specific subband is smaller than and nearest in image size to the display region measured by the number of pixels for the display region specified.

9. The image decompression apparatus as claimed in claim 1, further comprising:
a decompression area specifying unit to specify an area of an original image, the original image being then decompressed only for the specified area.

10. The image decompression apparatus as claimed in claim 1, further comprising:
a decompression component specifying unit to specify a component with respect to a color space of an original image, the original image being then decompressed only for the specified component.

11. The image decompression apparatus as claimed in claim 1, further comprising:
a processing-order specifying unit to specify an order of processing of an original image, the original image being then decompressed according to the specified order.

12. The image decompression apparatus as claimed in claim 9, wherein the decompression area specifying unit specifies the area of the original image using tile units or precinct units.

13. The image decompression apparatus as claimed in claim 10, wherein the color space comprises one of a system of R (red), G (green) and B (blue); a system of Y (luminosity), U (blue color difference) and V (red color difference); and a system of Y (luminosity), Cb (blue color difference) and Cr (red color difference).

14. The image decompression apparatus as claimed in claim 11, wherein the decompression operation is started from a maximum decomposition level or a minimum layer.

15. The image decompression apparatus as claimed in claim 11, wherein the decompression operation is started from an area for which the highest priority is set beforehand.

16. The image decompression apparatus as claimed in claim 1, wherein the input unit inputs a code sequence comprising code data of wavelet coefficients necessary for obtaining a decompressed image of a specific LL subband.

17. The image decompression apparatus as claimed in claim 1, further comprising a wavelet coefficient storage unit to store the code sequence of wavelet coefficients input by the input unit, the decoding unit to decode the code data stored in the wavelet coefficient storage unit,
wherein the wavelet coefficient storage unit is configured to store only a part of the input code sequence necessary to obtain the decompressed image of the specific LL subband.

18. The image decompression apparatus as claimed in claim 1, further comprising a unit to controlachieve decompression operations performed by the respective unit to be performed in parallel.

19. The image decompression apparatus as claimed in claim 1, further comprising:

a not-yet decompressed frame number specifying unit to specify the number of not-yet decompressed frames to be stored; and
a not-yet decompressed image storage unit to store the specified number of not-yet decompressed frames.

20. The image decompression apparatus as claimed in claim 1, further comprising:
an already-decompressed frame number specifying unit to specify the number of already-decompressed frames to be stored; and
an already-decompressed image storage unit to store the specified number of already-decompressed frames.

21. An image decompression method, comprising:
a) inputting a code sequence of wavelet coefficients;
b) decoding the code sequence to generate decoded wavelet coefficients;
c) performing inverse-quantization on the decoded wavelet coefficients to generate inverse-quantized wavelet coefficients;
d) performing inverse wavelet transform on inverse-quantized wavelet coefficients to obtain pixel values;
e) controlling operations of inputting the code sequence, decoding the input code sequence, performing inverse quantization, and performing an inverse wavelet transform to limit the operations to obtain a decompressed image of a specific LL subband;
f) specifying a display region on a predetermined display device using a number of pixels in a vertical direction or a number of pixels in a horizontal direction; and
g) determining a decomposition level, on which level the specific LL subband occurs, based on the specified display region.

22. The image decompression method defined in claim 21, further comprising:
specifying a size-change operation; and
performing the size-change operation by use of a pixel-value interpolation or a thinning-out operation performed on the decompressed image of the specific LL subband on the decomposition level selected.

23. The image decompression method defined in claim 21, wherein the decomposition level on which the specific subband occurs is determined such that the decompressed image of the specific subband is nearest in image size to the display region measured by the number of pixels for the display region specified.

24. The image decompression method defined in claim 21, wherein the decomposition level on which the specific subband occurs is determined such that the decompressed image of the specific subband is larger than and nearest in image size to the display region measured by the number of pixels for the display region specified.

25. The image decompression method defined in claim 21, wherein the decomposition level on which the specific subband occurs is determined such that the decompressed image of the specific subband is smaller than and nearest in image size to the display region measured by the number of pixels for the display region specified.

26. An article of manufacture having one or more readable media storing instructions which, when executed by a system, cause the system to:
a) input a code sequence of wavelet coefficients;
b) decode the code sequence to generate decoded wavelet coefficients;

c) perform inverse-quantization on the decoded wavelet coefficients to generate inverse-quantized wavelet coefficients;
d) perform inverse wavelet transform on inverse-quantized wavelet coefficients to obtain pixel values;
e) control execution of instructions to input the code sequence, decode the input code sequence, perform inverse quantization, and perform an inverse wavelet transform to limit the operations to obtain a decompressed image of a specific LL subband;
f) specify a display region on a predetermined display device using a number of pixels in a vertical direction or a number of pixels in a horizontal direction; and
g) determine a decomposition level, on which level the specific LL subband occurs, based on the specified display region.

* * * * *